(12) United States Patent
Fukuda et al.

(10) Patent No.: US 10,116,782 B2
(45) Date of Patent: Oct. 30, 2018

(54) TELEPHONE DEVICE AND MOBILE-PHONE LINKING METHOD

(71) Applicant: Panasonic Intellectual Property Management Co., Ltd., Osaka (JP)

(72) Inventors: Hikaru Fukuda, Fukuoka (JP); Hideyuki Matsuo, Fukuoka (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 0 days.

(21) Appl. No.: 15/179,422

(22) Filed: Jun. 10, 2016

(65) Prior Publication Data

US 2016/0286022 A1 Sep. 29, 2016

Related U.S. Application Data

(63) Continuation of application No. PCT/JP2014/006166, filed on Dec. 10, 2014.

(30) Foreign Application Priority Data

Dec. 10, 2013 (JP) .................................. 2013-254611

(51) Int. Cl.
*H04M 1/00* (2006.01)
*H04M 1/725* (2006.01)
(Continued)

(52) U.S. Cl.
CPC ... *H04M 1/72502* (2013.01); *H04M 1/72558* (2013.01); *H04M 2250/02* (2013.01); *H04M 2250/04* (2013.01)

(58) Field of Classification Search
CPC .. G06F 1/1632; G06F 1/1626; G06F 15/0225; G06F 21/35; G06F 13/385;
(Continued)

(56) References Cited

U.S. PATENT DOCUMENTS 7,130,608 B2 10/2006 Hollstrom et al.
8,503,948 B1 * 8/2013 Chow ............... H04M 1/72527
455/552.1
(Continued)

FOREIGN PATENT DOCUMENTS

JP 2001-168962 A 6/2001
JP 2003-516045 A 5/2003
(Continued)

OTHER PUBLICATIONS

International Search Report dated Jan. 13, 2015, for corresponding International Application PCT/JP2014/006166, 4 pages.
(Continued)

*Primary Examiner* — Ahmad F Matar
*Assistant Examiner* — Kharye Pope
(74) *Attorney, Agent, or Firm* — Seed IP Law Group LLP

(57) ABSTRACT

A telephone device includes a short-distance wireless communication unit that performs wireless communication of data with a mobile-phone, and a speaker from which audio data is output, in which a music playback function of the mobile-phone can be remotely operated from a place that is a distance away from the mobile-phone, and in which music playback is stopped by switching a radio resource to that for a telephone call and a smooth transition to a telephone call state can take place automatically without performing a playback stopping operation in a case where a mobile-destined call arrival or mobile-originated call-placing takes place while the music playback is in progress.

13 Claims, 17 Drawing Sheets

(51) Int. Cl.
*H04M 3/42* (2006.01)
*H04W 40/00* (2009.01)
*H04B 7/00* (2006.01)

(58) Field of Classification Search
CPC ... G06F 19/3406; H04W 88/06; H04W 92/02; H04W 4/18; H04W 88/04; H04W 4/008; H04W 92/18; H04M 1/2535; H04M 7/006; H04M 2250/02; H04M 1/04; H04M 1/7253; H04M 1/72572; H04M 1/6066; H04M 1/725; H04M 1/72502; H04M 1/72527; H04M 1/72558; H04M 3/42263; H04M 7/0069
USPC .......... 370/352, 353; 379/220.01, 219, 229; 710/303, 304
See application file for complete search history.

(56) References Cited

U.S. PATENT DOCUMENTS

| | | | | |
|---|---|---|---|---|
| 8,847,549 | B2 * | 9/2014 | Graham | H02J 7/0044 310/50 |
| 2001/0041588 | A1 | 11/2001 | Hollstrom et al. | |
| 2002/0045438 | A1 * | 4/2002 | Tagawa | H04M 1/72519 455/412.1 |
| 2003/0039238 | A1 * | 2/2003 | Ollis | H04L 29/06027 370/352 |
| 2006/0258406 | A1 | 11/2006 | Igarashi et al. | |
| 2006/0265726 | A1 * | 11/2006 | Byun | H04H 40/18 725/40 |
| 2007/0036281 | A1 | 2/2007 | Schulein et al. | |
| 2007/0049197 | A1 * | 3/2007 | Klein | H04M 1/6091 455/41.2 |
| 2007/0105548 | A1 * | 5/2007 | Mohan | H04M 1/725 455/426.1 |
| 2007/0173232 | A1 | 7/2007 | Kuo et al. | |
| 2007/0223668 | A1 * | 9/2007 | Blumenfeld | H04L 29/06027 379/201.01 |
| 2008/0055272 | A1 * | 3/2008 | Anzures | G06F 1/1626 345/173 |
| 2008/0075295 | A1 * | 3/2008 | Mayman | G06F 1/1632 381/79 |
| 2008/0101578 | A1 * | 5/2008 | Barros | H04M 3/2281 379/211.02 |
| 2008/0165153 | A1 * | 7/2008 | Platzer | G06F 1/1626 345/173 |
| 2008/0247413 | A1 * | 10/2008 | Ono | H04L 1/0083 370/432 |
| 2009/0059907 | A1 * | 3/2009 | Sindhwani | H04L 65/1069 370/354 |
| 2009/0113355 | A1 * | 4/2009 | Koo | G06F 3/0488 715/863 |
| 2009/0138507 | A1 * | 5/2009 | Burckart | G11B 27/105 |
| 2010/0115568 | A1 * | 5/2010 | Gupta | H04N 21/4312 725/106 |
| 2010/0124947 | A1 * | 5/2010 | Sano | H04M 1/7253 455/567 |
| 2011/0053640 | A1 * | 3/2011 | Bennett | H04M 1/7253 455/556.1 |
| 2011/0098087 | A1 * | 4/2011 | Tseng | G01C 21/265 455/557 |
| 2011/0145466 | A1 * | 6/2011 | Supran | G06F 1/1626 710/304 |
| 2012/0054400 | A1 * | 3/2012 | Iverson | G06F 13/385 710/303 |
| 2013/0103873 | A1 * | 4/2013 | Reilly | H04N 21/4126 710/303 |
| 2013/0117487 | A1 * | 5/2013 | Leung | G06F 1/1632 710/303 |
| 2013/0155170 | A1 * | 6/2013 | Eichen | H04W 76/02 348/14.02 |
| 2014/0031032 | A1 * | 1/2014 | Chow | H04W 92/00 455/426.1 |

FOREIGN PATENT DOCUMENTS

| | | |
|---|---|---|
| JP | 2005-033635 A | 2/2005 |
| JP | 2006-005617 A | 1/2006 |
| JP | 2006-295783 A | 10/2006 |
| JP | 2006-319572 A | 11/2006 |
| JP | 2012-004757 A | 1/2012 |
| WO | 2006/104887 A2 | 10/2006 |

OTHER PUBLICATIONS

Miura, "MN128-SOHO ni Muri Dial-up Router" 38 pages. [With English Abstract].

Extended European Search Report, dated Dec. 13, 2016, for corresponding EP Application No. 14870339.0-1972 / 3082323, 10 pages.

* cited by examiner

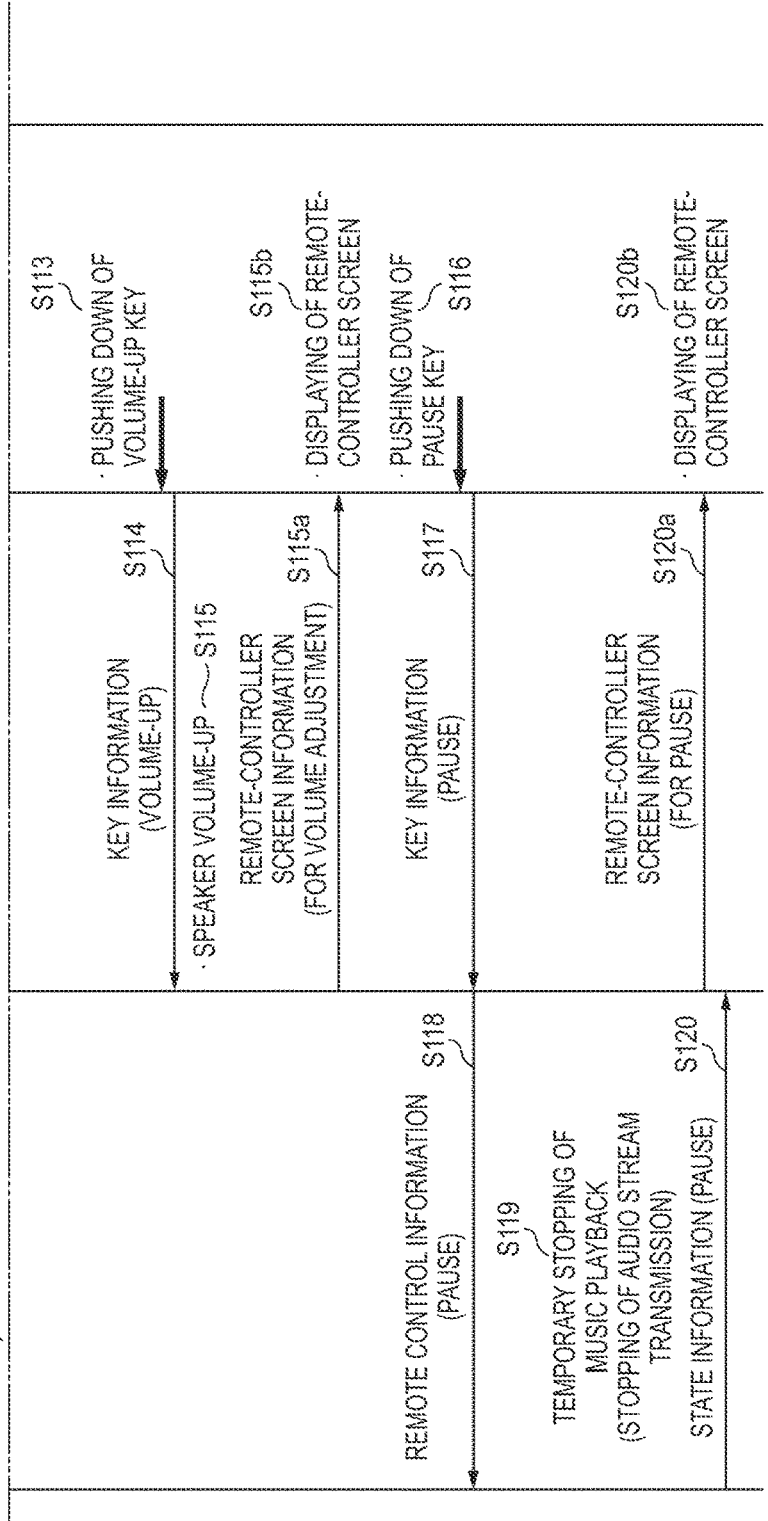

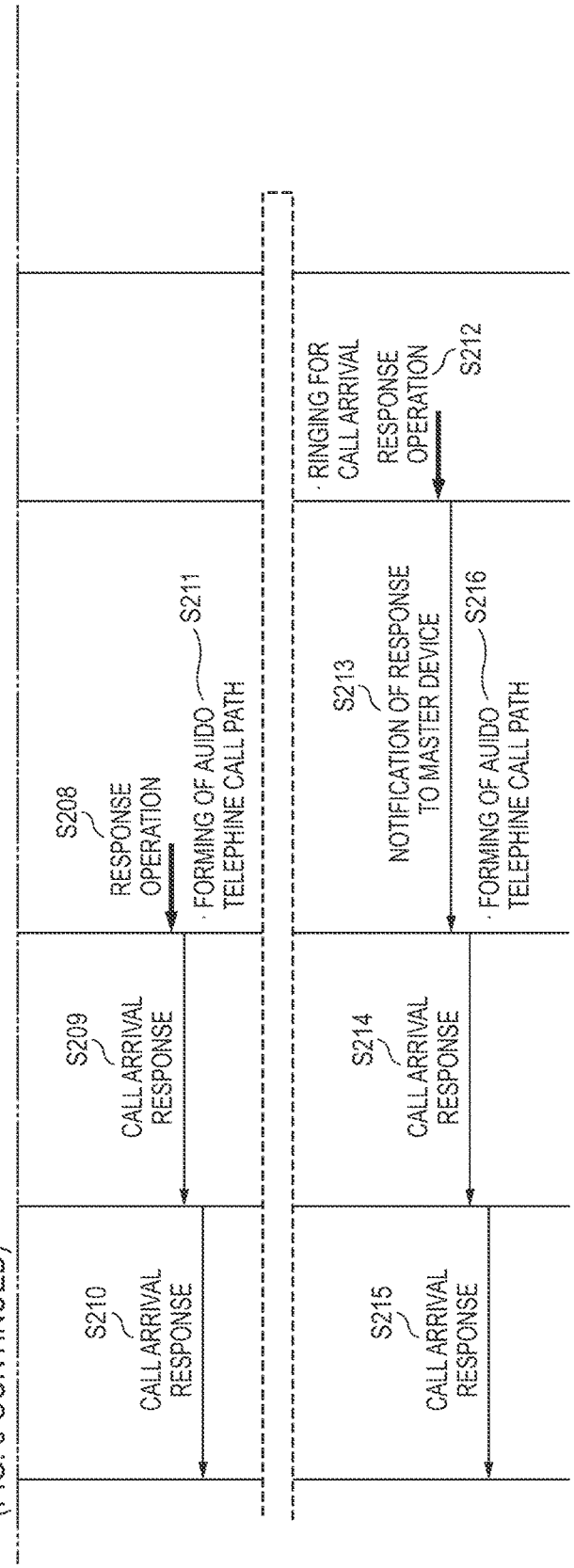

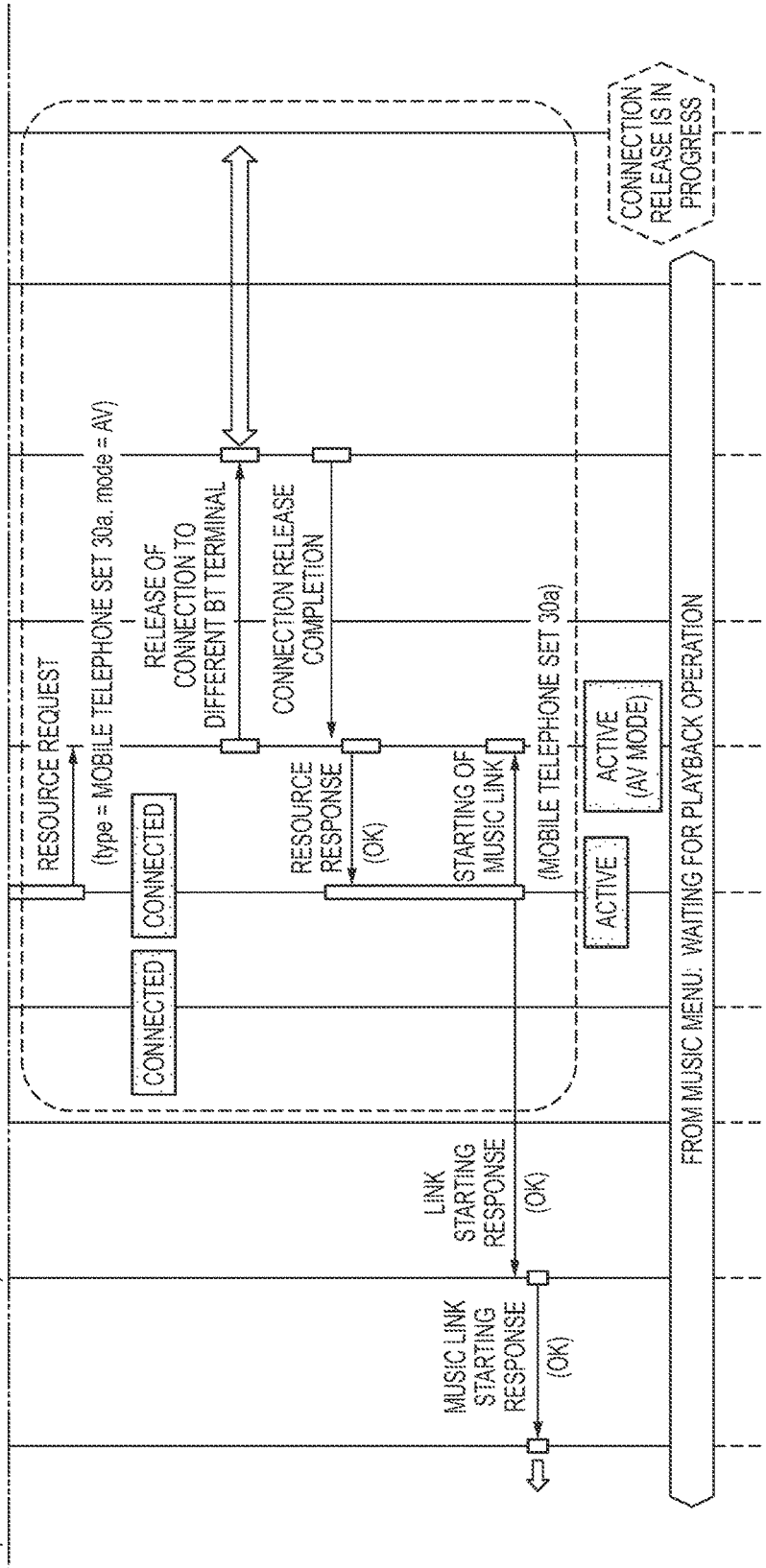

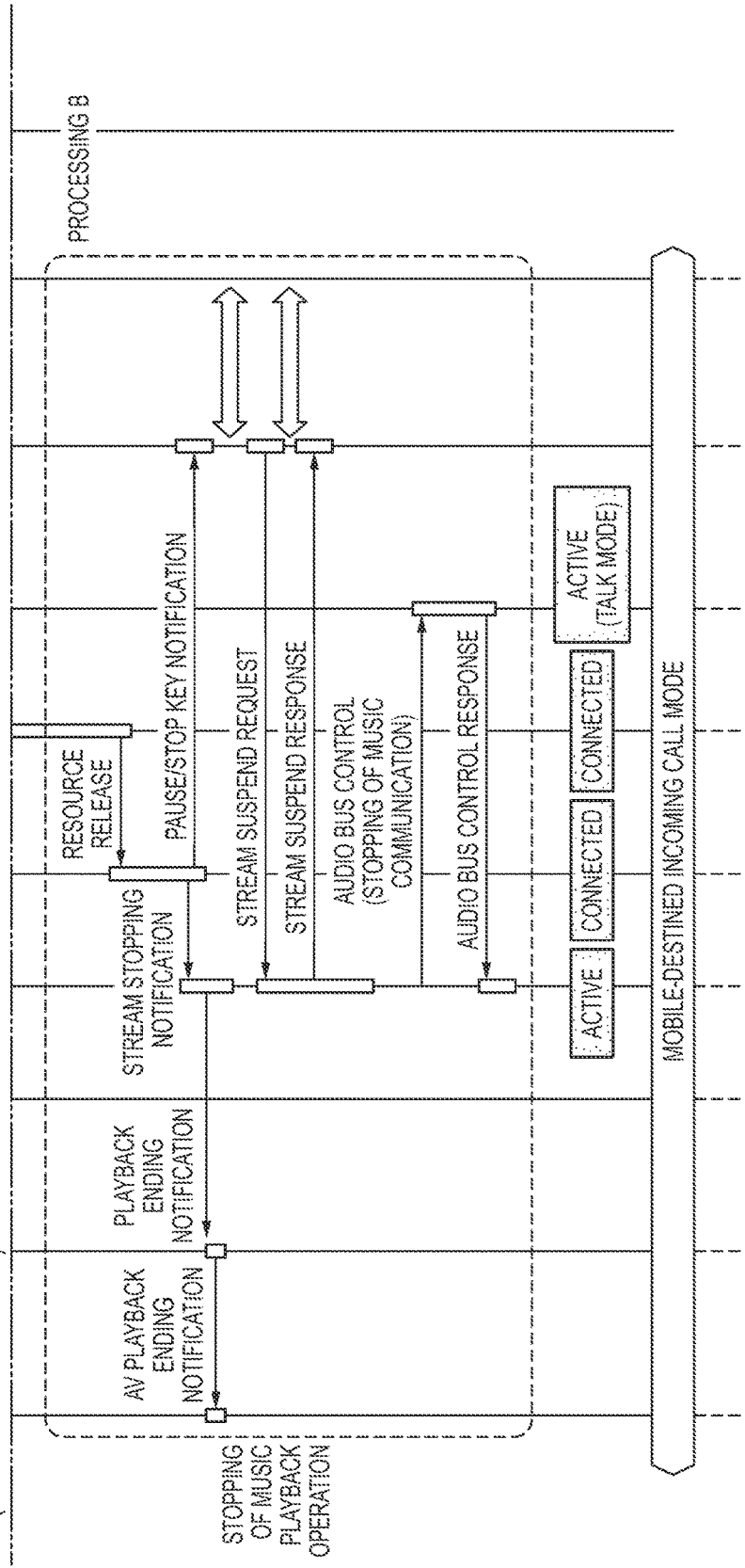
(FIG. 9 CONTINUED)

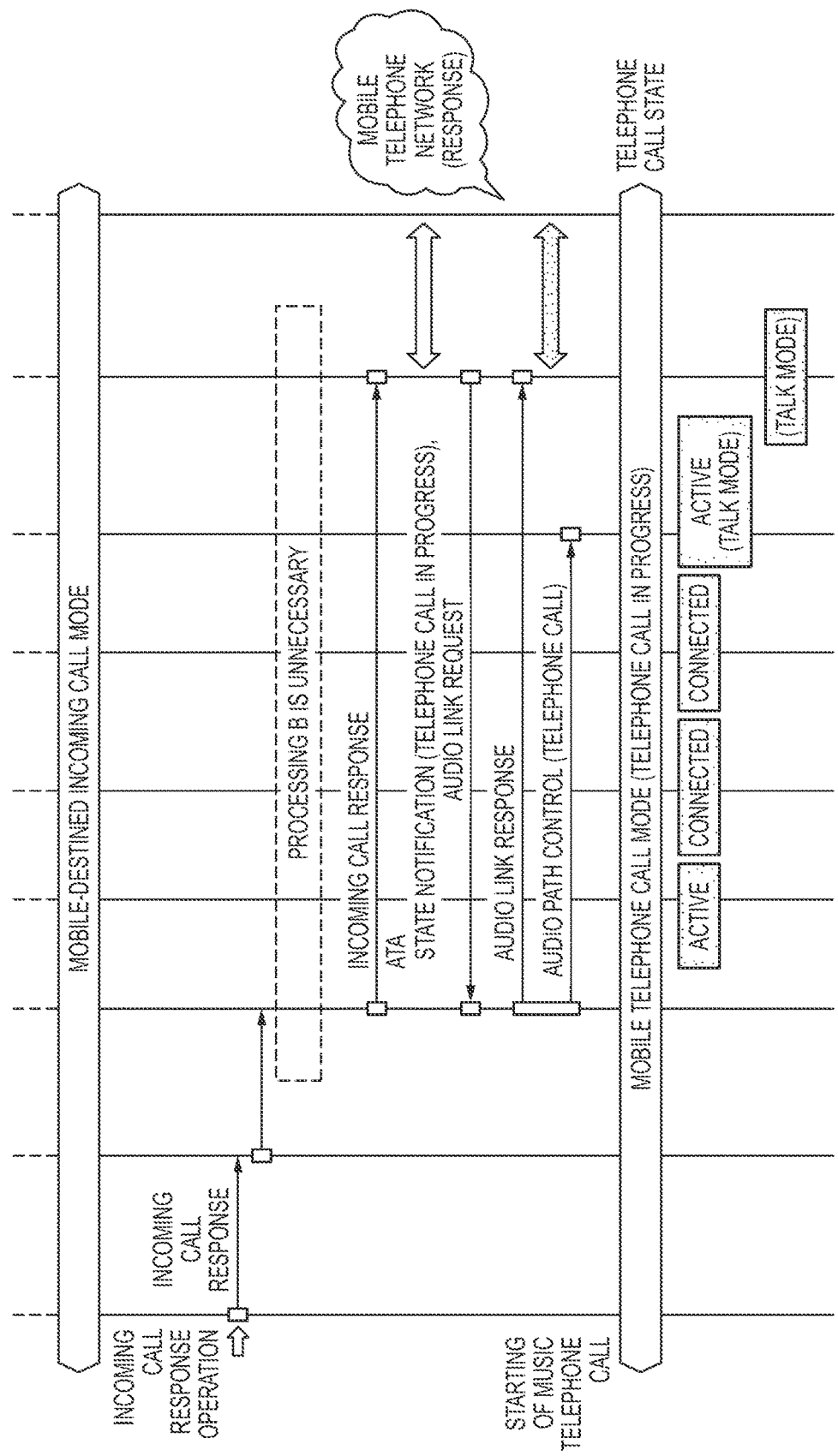

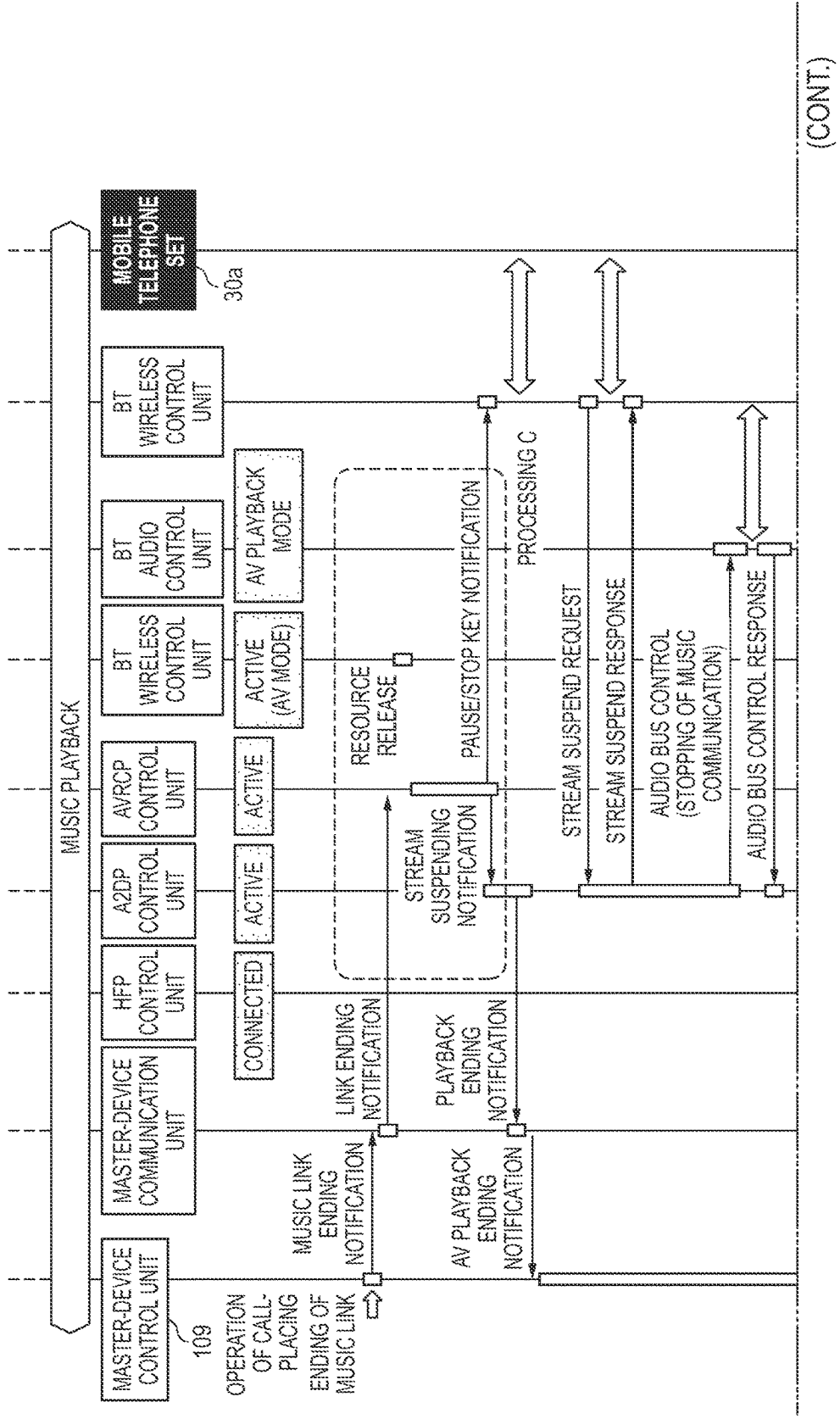

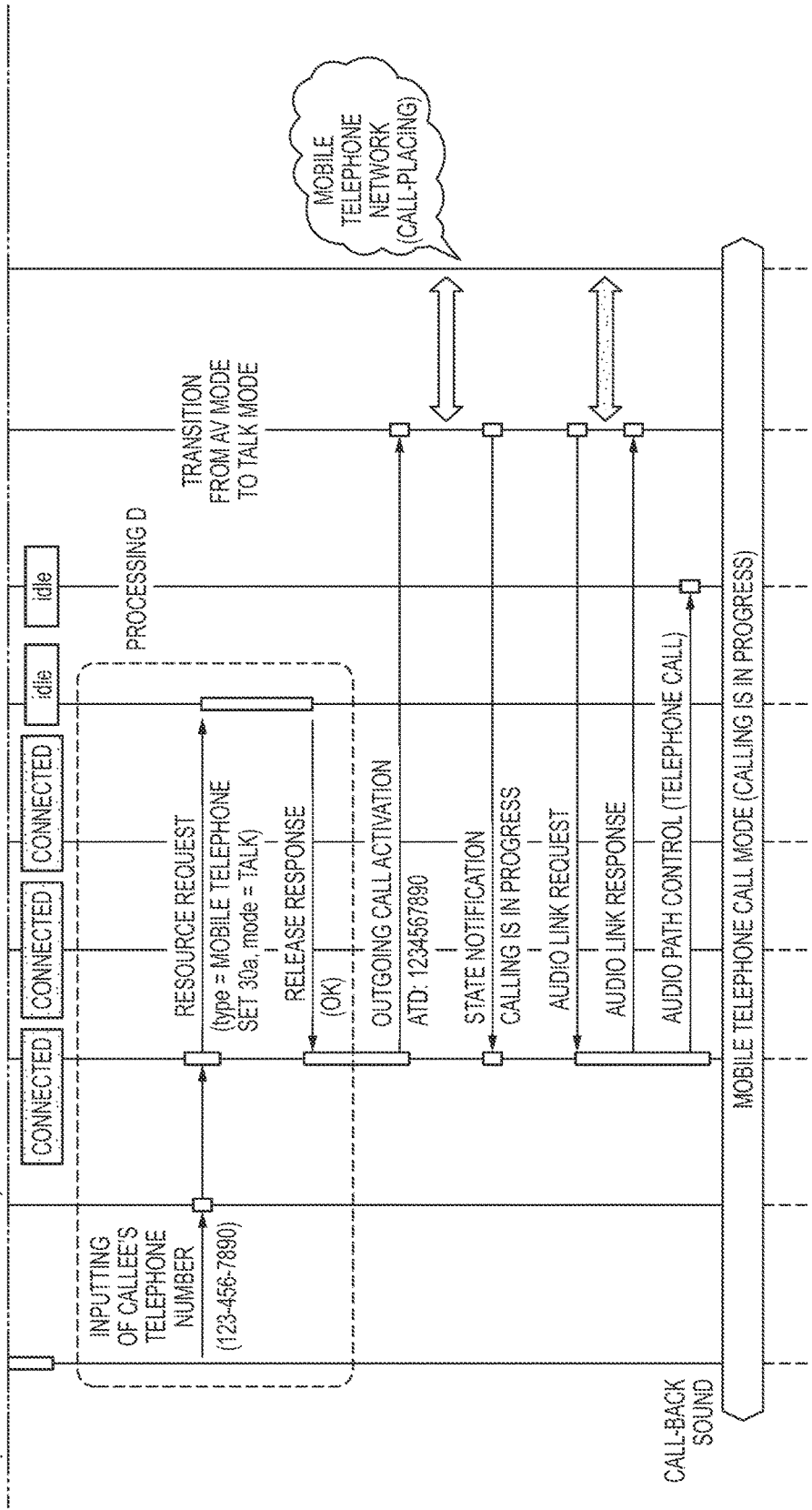

TELEPHONE DEVICE AND MOBILE-PHONE LINKING METHOD

BACKGROUND

Technical Field

The present invention relates to a telephone device and a mobile-phone linking method, in which an operation of performing a link with a mobile-phone is possible.

Description of the Related Art

In recent years, mobile-type music players, each of which is equipped with a function of playing back various music pieces, have come into wide use. A dedicated external speaker is connected to a music player and thus music pieces in the music player can be enjoyed at a higher sound volume. In some cases, in addition to the mobile-type music player that is equipped with the dedicated music player, there is also a mobile-phone terminal (for example, a smartphone or a mobile-phone) that is equipped with a function of a music player.

JP-A-2006-295783 discloses a mobile audio system that can have access to the mobile-phone and a mobile audio playback device. The mobile audio system is constituted from a mobile-phone, a mobile audio playback device, and a headphone that has operation means. The mobile audio system is constituted in such a manner that a call arrival for a mobile-phone is transferred without interrupting playback of a music piece in the mobile audio playback device itself. Furthermore, although the call arrival takes place while the playback of the music piece is progress, the call arrival can be reliably transferred without interrupting the playback.

In JP-A-2006-319572, in the mobile-phone includes a storage unit on which multiple pieces of music data and call arrival audio data are stored, and a short-distance wireless communication unit that complies with Bluetooth (a registered trademark) or the like. In a case where, while first music data is transmitted to an audio device that is equipped with an external short-distance wireless communication function, a mobile-destined call arrival causes interruption, the transmission of the first music data is stopped, and second music data (for example, the call arrival audio data) independent of the first music data that is transmitted is transmitted to the audio device.

Furthermore, JP-A-2005-33635 discloses that a telephone set which is connected to a landline telephone line and the mobile-phone are linked. JP-A-2005-33635 discloses that the mobile-phone includes a wireless unit that performs communication with a base station, and a short-distance wireless unit that complies with Bluetooth (a registered trademark) or the like for short-distance wireless communication with a landline telephone set; that in a case where a call arrival for mobile-phone takes place, the mobile-phone is called; and that in a case where a prescribed condition is satisfied, a landline telephone set is called through the short-distance wireless unit. Furthermore, in JP-A-2005-33635, in a case where the landline telephone set makes a response, a central control unit of the landline telephone set transfers the response to the mobile-phone through the short-distance wireless unit, and after the response is made, a telephone call path setting unit of the landline telephone set sets a telephone call path with a caller on the mobile-phone side through the short-distance wireless unit.

It is considered that, when music is played back using an audio playback function of the mobile-phone, a telephone set that is connected to the landline telephone network and the mobile-phone are linked, a playback sound signal is sent to the landline telephone set using the short-distance wireless communication, and the landline telephone set is used instead of an external speaker for music playback. However, several problems occur because a link between the mobile-phone and the landline telephone set is insufficient at the time of the music playback by the mobile-phone.

In a case where the landline telephone set is used instead of a speaker of the audio playback device, in most cases, the mobile-phone is placed at a location away from the landline telephone set, and a user cannot hear a calling sound that is emitted by the mobile-phone at the time of the call arrival in the mobile-phone. In a case where it is assumed that the landline telephone set is put in the place of the audio playback device in JP-A-2006-319572, when the call arrival for the mobile-phone takes place, the mobile-phone sends the call arrival audio data to the landline telephone set instead of the music data while the playback is in progress. However, this operation is limited to a case where the mobile-phone that has such a mechanism is used, and setting of the telephone call path with the caller on the mobile-phone side is not disclosed. Furthermore, in a case where the telephone call by the landline telephone set starts in response to the call arrival, a music playback sound interrupts the telephone call.

In JP-A-2005-33635, whether, in a case where a response to the mobile-destined call arrival is made in the landline telephone set: the telephone call path with the caller on the mobile-phone side through the short-distance wireless unit that complies with Bluetooth (a registered trademark) or the like is set; there is not provided a solution on whether when the telephone call path is set; a radio resource that has so far been secured by the short-distance wireless unit for the music playback is changed or is used as is; or an audio channel in the direction of sending audio from the landline telephone set side to the mobile-phone is established in order to set a bidirectional telephone call path for audio.

Furthermore, in a case where, for the radio resource secured by the short-distance wireless unit for the music playback, broadband has been secured, if the radio resource is used, as is, as the telephone call path, such broadband is so broad that it is unnecessary for the telephone call. In a case where a resource in the short-distance wireless unit is limited in terms of cost and the like, there is a need to perform re-setting to a bidirectional telephone call path in a narrow band in order to set an audio telephone call path, but no solution is disclosed in the related art.

BRIEF SUMMARY

According to the present invention, which is made in view of the situations described above, there is provided a cordless telephone device and a mobile-phone linking method, in which a link between a mobile-phone and a cordless telephone device can be strengthened in a case where audio data is played back by the mobile-phone, and in which a smooth transition to a telephone call state can take place even in a case where a call arrival or call-placing takes place at the time of music playback.

According to the present invention, there is provided a telephone device that is connected to a landline telephone network, including: a master-device control unit that controls the telephone device; a short-distance wireless communication control unit that controls short-distance wireless communication of data with a mobile-phone; a speaker from which audio data is acoustically output; and an audio processing unit that receives audio data from the mobile-phone using the short-distance wireless communication and causes the speaker to perform music playback by outputting the audio data from the mobile phone to the speaker, wherein when the master-device control unit receives a signal indicating that a call arrival has taken place in the mobile-phone during output of the audio data from the speaker, the short-distance wireless communication control unit starts processing that releases a radio resource for the music playback and sets a radio resource for a telephone call, and notifies the master-device control unit of the call arrival by starting a mobile-destined call arrival sequence with the master-device control unit when the processing that releases a radio resource used for the music playback and sets a radio resource for a telephone call is started. By doing this, when a user makes a response to the arrival of the call at the mobile-phone while the playback of the music data from the mobile-phone is in progress in the telephone device, the smooth transition to the telephone call state can take place without the need to stop the music playback or perform an operation for securing the radio resource.

According to the present invention, a telephone device can also be used as an external speaker of a mobile-phone for music playback, and a music playback function of the mobile-phone can be remotely controlled from a place away from the mobile-phone. Furthermore, the music playback can be stopped by automatically switching a radio resource to that for a telephone call, and a smooth transition to a telephone call state can take place without performing a playback stopping operation in a case where a mobile-destined call arrival or mobile-originated call-placing takes place while the music playback is in progress. Furthermore, in a case where the cordless telephone slave device is involved, information on a music piece can be checked from a place away from a mobile-phone or a cordless telephone master device, and telephone call activation (performing of a different function) is freely performed by operating of a cordless telephone slave device while the music playback is performed by a speaker of the cordless telephone master device.

BRIEF DESCRIPTION OF THE SEVERAL VIEWS OF THE DRAWINGS

FIG. 10 is a sequence diagram for describing in detail a case where a response to the call arrival is made in the control of the mobile link between the master device of the cordless telephone device and the mobile-phone according to the embodiment of the present invention.

FIG. 11 is a sequence diagram for describing in detail control of the link in a case where a mobile-originated call is placed in the control of the mobile link between the master device of the cordless telephone device and the mobile-phone according to the embodiment of the present invention.

DETAILED DESCRIPTION

Figure 1:
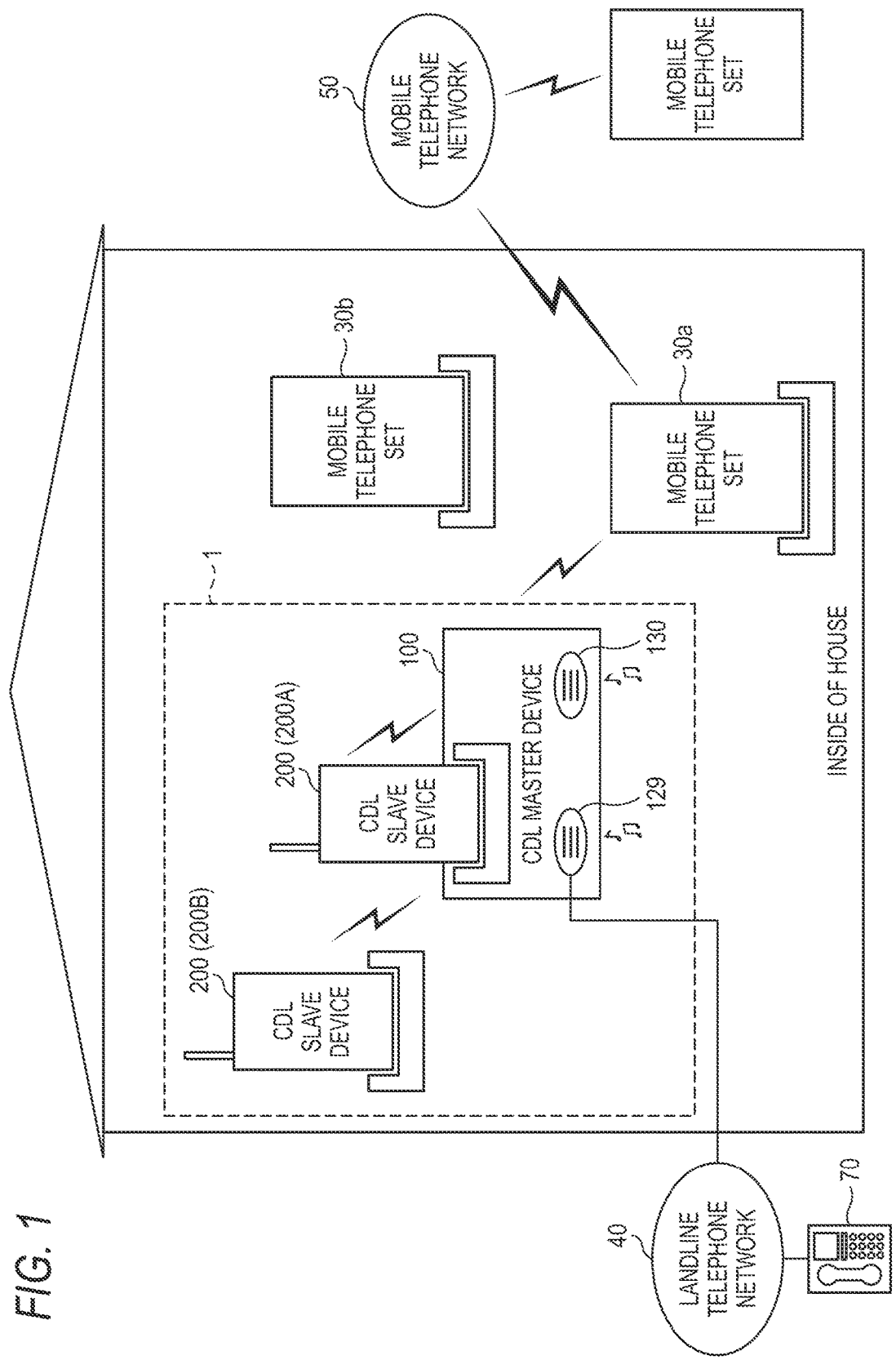
FIG. 1 is a block diagram illustrating a configuration example of a cordless telephone device according to the embodiment of the present invention.

A linking method of linking a cordless telephone device and a mobile-phone according to an aspect of the present invention will be described below. FIG. 1 is a schematic diagram illustrating a configuration example of the cordless telephone device according to the embodiment of the present invention. A "cordless telephone" will be described below as a "CDL" for short.

Examples of a CDL device 1 that is illustrated in FIG. 1 include the CDL device 1 itself, a mobile-phone 30a, and a mobile-phone 30b. The CDL devices 1 include a CDL master device 100 and a CDL slave device 200 (200A or 200B).

The CDL master device 100 has a function of cooperating with a mobile-phone 30. The mobile-phone 30 performs an audio telephone call through a mobile-phone network 50. For example, the mobile-phone 30a is a so-called smartphone that has multiple functions, and, among the multiple functions, includes the function of a music player.

Moreover, two CDL slave devices, that is, the CDL slave devices 200A and 200B, are included in the CDL device 1, as are illustrated in FIG. 1, but the number of CDL slave devices may be 1, or 3 or greater.

The CDL master device 100 is connected to a telephone line of a landline telephone network 40. Because a wireless connection is made between the CDL master device 100 and the CDL slave device 200, a position of the CDL slave device 200, for example, can be moved freely within a house.

The CDL master device 100 is connected to a different telephone device 70 through the landline telephone network 40, and performs various types of communication (for example, a telephone call). The CDL slave device 200 is connected to a different telephone device through the CDL master device 100 and the landline telephone network 40, and performs various types of communication (for example, a telephone call).

When it comes to a scheme for wireless communication between the CDL master device 100 and the CDL slave device 200, the CDL device 1 may employ a scheme that is used in a known cordless telephone device. For example, there are a personal handy-phone system (PHS) scheme and a digital enhanced cordless telecommunications (DECT) scheme that use a 1.9 GHz band, a worldwide digital cordless telephone (WDCT) that uses a 2.4 GHz band, and the like.

A scheme for wireless communication between the CDL master device 100 and the mobile-phone 30 may be a communication scheme that is used as an indoor short-range wireless communication technology. For example, there are communication schemes such as an IEEE 802.15.1 scheme (Bluetooth (a registered trademark)), an IEEE 802.11 scheme (a wireless LAN), and an IEEE 802.15.4 scheme (ZigBee (a registered trademark)). With regard to the scheme for the wireless communication between the CDL master device 100 and the mobile-phone 30, an example in which the wireless connection is made with Bluetooth (a registered trademark), and a cooperative operation is performed, is described.

In a case where the mobile-phone 30 plays back audio data, audio data may be audio-output (be output as a sound) from speakers 129 and 130 that are included in the CDL master device 100. More precisely, the speakers 129 and 130 of the CDL master device 100 can be used as an external speaker of the mobile-phone 30.

Pieces of audio data, which are played back by the mobile-phone 30, broadly include, for example, music data, audio data that is obtained by recording conversations, ambient-sound data, and other pieces of data relating to audio that is reproducible by a general music player.

In a case where the mobile-phone 30 plays back the audio data, the CDL slave device 200 may remotely control the mobile-phone 30 through the CDL master device 100. More precisely, the CDL slave device 200 can be used as a remote controller that operates the mobile-phone 30.

Figure 2:
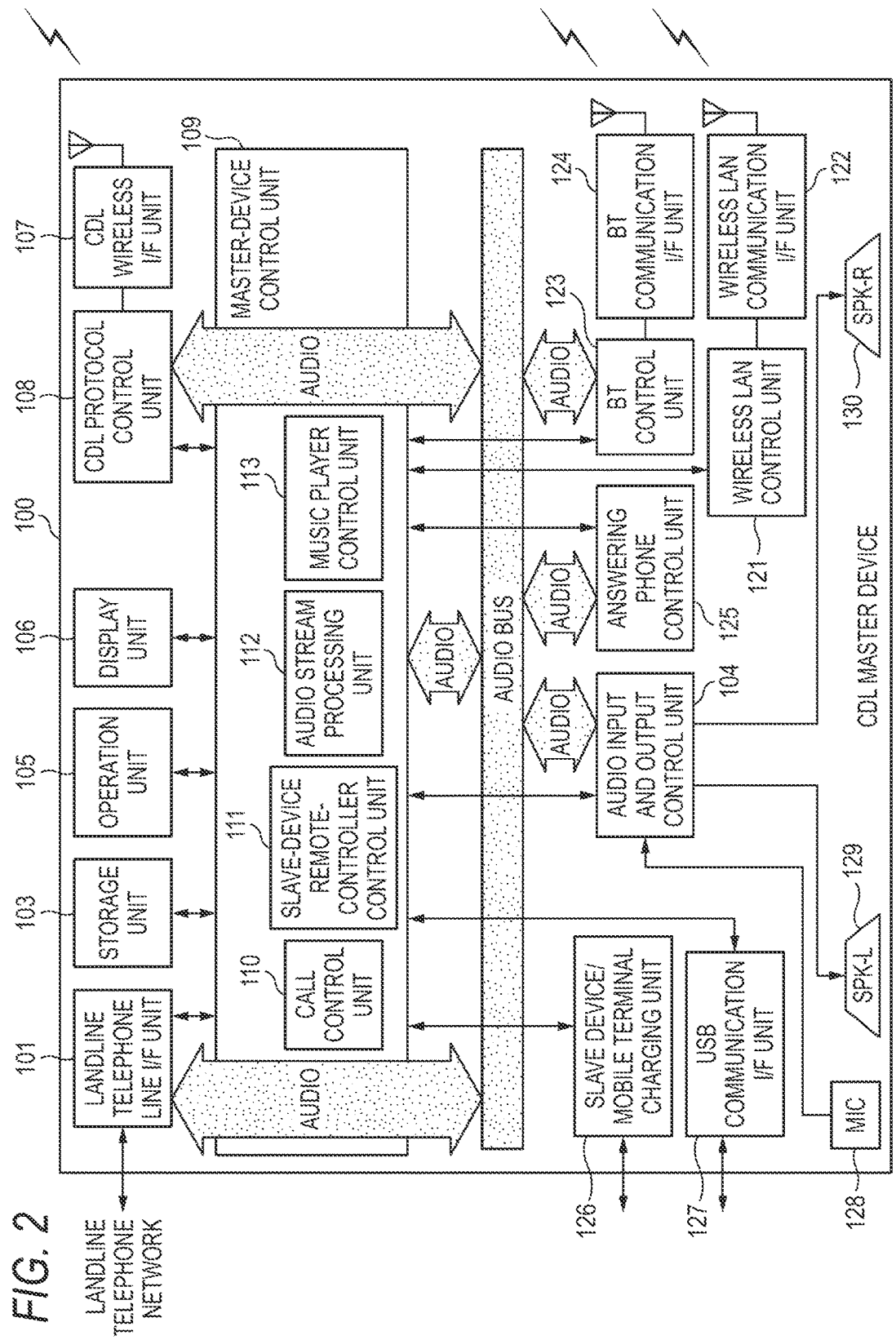
FIG. 2 is a block diagram illustrating a configuration example of a cordless telephone master device according to the embodiment of the present invention.

Next, a configuration example of the CDL master device 100 is described. FIG. 2 is a block diagram indicating the configuration example of the CDL master device 100.

The CDL master device 100 includes a landline telephone line interface (I/F) unit 101, a storage unit 103, an audio input and output control unit 104, an operation unit 105, a display unit 106, a CDL wireless I/F unit 107, and a CDL protocol control unit 108. The CDL master device 100 includes a master-device control unit 109, a wireless LAN control unit 121, a wireless LAN communication I/F unit 122, a Bluetooth (a registered trademark) (BT) control unit 123, and a BT communication I/F unit 124. The CDL master device 100 includes an answering phone control unit 125, a slave device/mobile terminal charging unit 126, a universal serial bus (USB) communication I/F unit 127, a microphone (MIC) 10a, and speakers (SPK-L and SPK-R) 129 and 130.

The master-device control unit 109 includes a call control unit 110, a slave-device remote-controller control unit 111, an audio stream processing unit 112, and a music player control unit 113.

The landline telephone line I/F unit 101 includes a network control unit (NCU) and a modem. The NCU performs control of the telephone line. For example, the NCU detects an incoming call from the landline telephone network 40 and, at the time of an outgoing call, captures access to the landline telephone network 40. The modem, for example, receives a caller's telephone number and the like from the landline telephone network 40 at the time of the incoming call. Moreover, the landline telephone line I/F unit 101 is not limited by a configuration of the network control unit to a connection to an analog telephone line, and can be connected to a digital telephone line, such as an ISDN line or an IP telephone line.

The storage unit 103 is constituted to include a volatile memory (RAM) and a non-volatile memory (ROM, EPROM, or like). Stored in the storage unit 103 are various programs and various pieces of information (various parameters for determining a condition for operation of the CDL device 1, telephone directory information, and call-placing and call-arrival history information).

The audio input and output control unit 104 analog converts in an analogous manner digitally-signaled audio data that comes from an audio path, and performs control of an output to the speakers 129 and 130, and a volume output control and audio quality control according to an instruction from the master-device control unit 109. Furthermore, the microphone 128 converts analog audio that is received from the audio path, into digital audio, and performs control of transmission of the resulting audio to the audio path. This is done in a case where a hands-free telephone call is made using the microphone 128 and the speakers 129 and 130. Furthermore, audio signals that are output to the speakers 129 and 130 include, for example, a call-arrival sound and audio data that is acquired from the mobile-phone 30, in addition to telephone call audio. The audio signal is used as the call-arrival sound that is output, and the speakers 129 and 130 are used as external speakers of the mobile-phone. Moreover, a stereo sound or a monaural sound is output from the speakers 129 and 130, using audio data that is received by the audio input and output control unit 104.

The operation unit 105, for example, includes multiple buttons which it is possible for the user to operate, and receives an operational input. For example, buttons include dial keys necessary for a dial input at the time of placing a call, function keys to which various functions are allocated such as a PLAY key/STOP key/PAUSE key for link control of the music player, volume adjustment keys for adjusting a volume for the speaker, and soft keys for activating functions that are displayed in a state of being associated with display positions on the display unit 106.

The display unit 106 is constituted to include a liquid crystal display and drivers thereof, and various pieces of information (for example, a telephone number, information on a communication destination or a communication source, and operation guide information) are displayed on the display unit 106.

The CDL wireless I/F unit 107 includes a transmission and reception circuit for performing wireless communication between the CDL master device 100 itself and the CDL slave device 200. Although not illustrated, with a radio frequency (RF) unit, the CDL wireless I/F unit 107 performs transmission and reception of a radio signal through an antenna. Furthermore, the CDL wireless I/F unit 107 is also a music transfer interface unit for transferring a music playback audio signal to the slave device, and transmits an ADPCM signal that is playback audio, to the CDL slave device 200, in a state of being inserted in a payload that is set to be in a transmission frame for time division communication.

With a protocol stack unit that transmits and receives data between the CDL master device 100 itself and the CDL slave device 200, the CDL protocol control unit 108 performs protocol control in accordance with a control protocol (for example, a DECT protocol scheme or a PHS protocol scheme) between the CDL master device 100 itself and the CDL slave device 200.

The master-device control unit 109, for example, is constituted to include hardware items, among which a main hardware item is made to be a microcomputer, and executes a program that is embedded in advance, thereby realizing various functions that are retained by the master-device control unit 109. The master-device control unit 109 controls the entire CDL master device 100.

The call control unit 110 processes an event or various messages that are notified from the operation unit 105, the landline telephone line I/F unit 101, or the CDL protocol control unit 108 (the CDL slave device 200), and performs state management of a call that takes place in the CDL master device 100, and a call connection. Furthermore, the call control unit 110 performs control of output/stop of the call-arrival sound, or notifies the slave-device remote-controller control unit 111 or the music player control unit 113, which will be described below, of various internal events (a key input from the CDL slave device, a remote control instruction to the mobile-phone 30, and the like). Thus, for example, when an incoming call from the landline telephone network 40 is detected, the call control unit 110 stops output of the audio data received from the mobile-phone 30 to the speaker 129, and performs control that outputs the call arrival sound.

The slave-device remote-controller control unit 111 performs control in such a manner that the CDL slave device 200 operates as an operation unit for remotely operating the mobile-phone 30. For example, in a case where the CDL slave device 200 operates as the remote controller that operates the mobile-phone 30, the slave-device remote-controller control unit 111 edits information on a remote-controller screen for assisting remote controller control, and transmits a result of the editing to the CDL slave device 200. The remote-controller screen information, for example, is generated based on a correspondence relationship between processing that, with a remote operation, the mobile-phone 30 is instructed to perform, and a key on an operation unit 144 of the CDL slave device 200.

The slave-device remote-controller control unit 111 acquires key-generated information from the CDL slave device 200, which is received through the CDL wireless I/F unit 107, through the call control unit 110, acquires the remote controller control (for example, PLAY, STOP, or PAUSE) of the mobile-phone 30 that is associated with a key on the remote-controller screen information that is being displayed, and notifies the music player control unit 113 of remote control information that corresponds to the remote controller control. Furthermore, if a key operation on the CDL slave device 200 is a key operation for an increase/decrease in volume, the slave-device remote-controller control unit 111 instructs the audio input and output control unit 104 to increase or decrease the volume.

The audio stream processing unit 112 performs connection procedure control for communication of an audio stream from the mobile-phone 30, and, in order to output audio stream data sent from the mobile-phone 30 to the speakers 129 and 130, forms an audio path from the BT control unit 123 to the audio input and output control unit 104. Moreover, buffering may be performed, in the audio stream processing unit 112, between the BT control unit 123 and the audio input and output control unit 104, and thus the audio path from the BT control unit 123 to the audio input and output control unit 104 may be formed. An audio path that goes through the audio path from the BT control unit 123 to the audio input and output control unit 104 may be formed without going through the audio stream processing unit 112.

Furthermore, in a case where the audio stream data is received through the wireless LAN communication I/F unit 122, the audio stream data is temporarily buffered in the audio stream processing unit 112, and the audio path to the audio input and output control unit 104 is formed going through the audio path.

In a connection procedure for the audio stream communication, an advanced audio distribution profile (A2DP) may be employed in the case of Bluetooth (a registered trademark), and other stream protocols for audio streaming, such as a real-time streaming protocol (RTSP), may be employed in a general case.

The music player control unit 113 performs management of a state of the mobile-phone 30, and remotely controls the mobile-phone 30. The music player control unit 113 transmits the remote control information (for example, PLAY, STOP, or PAUSE) for remotely operating the mobile-phone 30 to the mobile-phone 30 through a wireless line.

The remote control information, for example, may be generated according to information that is operationally input through the operation unit 105 of the CDL master device 100, and may be generated according to information that is operationally input through the operation unit 144 of the CDL slave device 200.

Moreover, a communication procedure for the remote control of the mobile-phone 30 by the CDL master device 100 may be performed by agreeing on a control message independently between devices in mutual communication, but, between Bluetooth (a registered trademark)-enabled devices, is able to be performed using an audio/video remote control profile (AVRCP).

In accordance with IEEE 802.11, that is, wireless LAN specifications, the wireless LAN control unit 121 and the wireless LAN communication I/F unit 122 makes connections to external wireless LAN devices and performs data communication.

The BT communication I/F unit 124 is an RF unit (a wireless IC) that transmits and receives a radio signal in compliance with Bluetooth (a registered trademark) through an antenna, and the BT control unit 123 performs a control instruction to the RF unit, and baseband control, such as communication link control or packet control.

For the wireless communication between the CDL master device 100 and the mobile-phone 30, the BT communication I/F unit 124 is in a state of a wireless connection using Bluetooth (a registered trademark).

The answering phone control unit 125, for example, stores an answering phone message, and controls message recording and playback.

The slave device/mobile terminal charging unit 126, for example, charges a rechargeable battery that is mounted in the CDL slave device 200, the mobile-phone 30, or a different mobile terminal. The slave device/mobile terminal charging unit 126 may include a docking unit in which a charging-target terminal is placed, and charging terminals, and may perform the charging. The slave device/mobile terminal charging unit 126, as a charging unit that corresponds to Qi (chee) and the like that are standard specifications for wireless electric supply, may perform wireless electric supply.

A USB communication I/F unit 127 is a communication interface that connects various devices (for example, the mobile-phone 30) that comply with USB specifications, to the CDL master device 100. The USB communication I/F unit 127, for example, may operate as an electric power supply unit that supplies electric power to the CDL slave device 200 or the mobile-phone 30.

Two speakers, that is, the speakers 129 and 130 are illustrated as stereo-type speakers in FIG. 2, but one speaker as one monophonic type may be available.

Next, a configuration example of the CDL slave device 200 is described.

Figure 3:
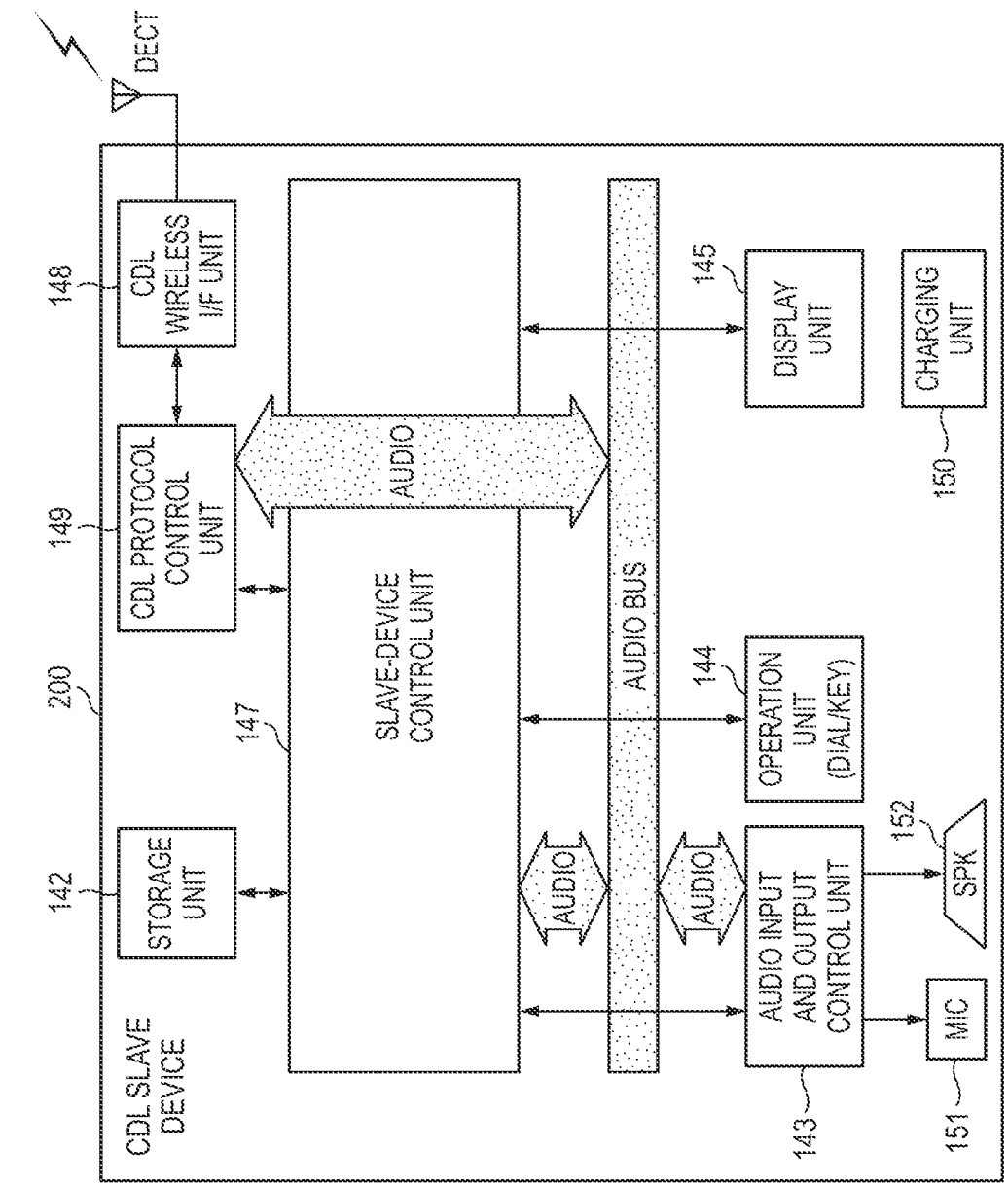
FIG. 3 is a block diagram illustrating a configuration example of a cordless telephone slave device according to the embodiment of the present invention.

FIG. 3 is a block diagram illustrating a configuration example of the CDL slave device 200.

The CDL slave device 200 includes a storage unit 142, an audio input/output control unit 143, the operation unit 144, a display unit 145, a slave-device control unit 147, a CDL wireless I/F unit 148, a CDL protocol control unit 149, a rechargeable battery 150, a microphone (MIC) 151, and a speaker (SPK) 152.

The storage unit 142 is constituted to include a volatile memory (RAM) and a non-volatile memory (ROM, EPROM, or like). Stored in the storage unit 142 are various programs and various pieces of information (for example, telephone directory information and call-placing and call-arrival history information).

The audio input/output control unit 143 performs control in such a manner that an audio signal is input or output through the microphone 151 and the speaker 152. Audio signals that are output to the speaker 152 includes, for example, a call-arrival sound, telephone call audio, an answering phone message, and the like.

The operation unit 144, for example, includes multiple buttons that are for the user to operate, and receives an operation input. Buttons include, for example, dial keys necessary for a dial input at the time of placing a call, a function key to which various functions are allocated, soft keys for activating functions that are displayed in a state of being associated with display positions on the display unit 145, and arrow keys for selecting upward, downward, leftward, and rightward directions. The operation unit 144 may be a touch panel that overlaps the display unit 145.

The display unit 145 is constituted to include a liquid crystal display and drivers thereof, and various pieces of information (for example, a telephone number, information on a communication destination or a communication source, and operation guide information) are displayed on the display unit 145. Furthermore, in a case where the CDL slave device 200 operates as the remote controller that operates the mobile-phone 30, the remote-controller screen is displayed on the display unit 145.

The slave-device control unit 147, for example, is constituted to include hardware items, among which a main hardware item is made to be a microcomputer, and executes a program that is embedded in advance, thereby realizing various functions that are retained by the slave-device control unit 147. The slave-device control unit 147 controls the entire CDL slave device 200.

The CDL wireless I/F unit 148 includes a transmission and reception circuit for performing wireless communication between the CDL slave device 200 itself and the CDL master device 100. Although not illustrated, with an RF unit, the CDL wireless I/F unit 148 performs transmission and reception of a radio signal through an antenna.

With a protocol stack unit that transmits and receives data between the CDL slave device 200 itself and the CDL master device 100, the CDL protocol control unit 149 performs protocol control in accordance with a control protocol (for example, a DECT protocol scheme, a PHS protocol scheme, a WDCT scheme, or the like) between the CDL slave device 200 itself and the CDL master device 100.

The rechargeable battery 150 supplies electric power of a power source to each unit of the CDL slave device 200. For example, the CDL slave device 200 is placed in the slave device/mobile terminal charging unit 126 of the CDL master device 100, and thus the rechargeable battery 150 is charged.

Figure 4:
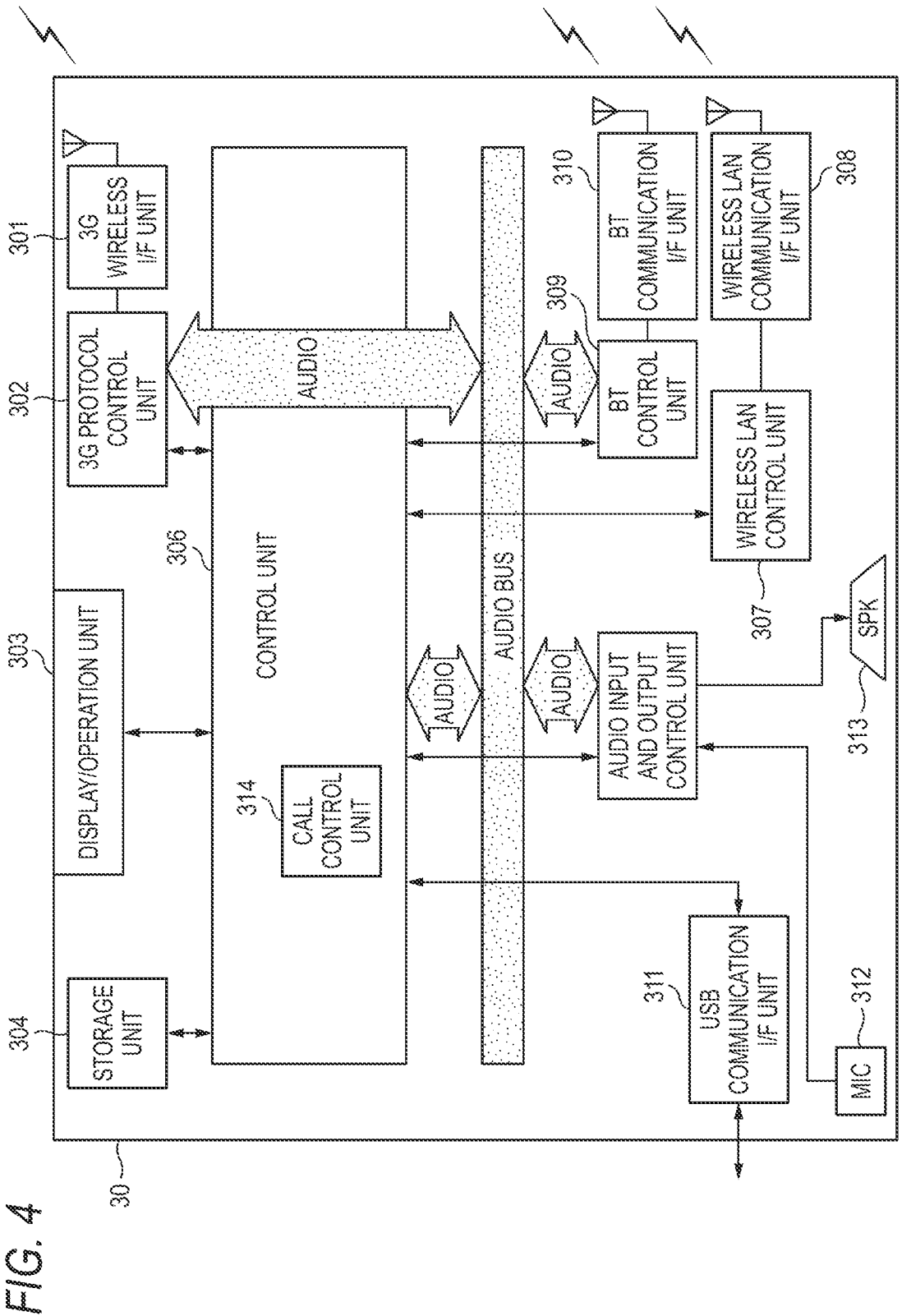
FIG. 4 is a block diagram illustrating a configuration example of a mobile-phone that performs a link according to the embodiment of the present invention.

Next, a configuration example of the mobile-phone 30 is described. FIG. 4 is a functional block diagram illustrating one example of the mobile-phone that is linked with a telephone device according to the present invention.

The mobile-phone 30 includes a 3G wireless I/F unit 301 and a 3G protocol control unit 302 in order to perform communication with the mobile-phone network 50. Furthermore, the mobile-phone 30 includes a BT control unit 309 and a BT communication I/F unit 310 that are audio signal output interfaces which are provided for the original purpose of mainly outputting playback audio to a wireless headset.

Furthermore, the mobile-phone 30 includes a wireless LAN control unit 307 and a wireless LAN communication I/F unit 308 in order to perform communication through a local network in a wireless manner. Furthermore, the mobile-phone 30 includes a display/operation unit 303, a storage unit 304, and an audio input and output control unit 305. Furthermore, the mobile-phone 30 includes a universal serial bus (USB) communication I/F unit 311, a microphone (MIC) 312, and a speaker (SPK) 313.

Furthermore, the mobile-phone 30 includes a control unit 306. The control unit 306 includes a call control unit 314.

The 3G wireless I/F unit 301 and the 3G protocol control unit 302 perform the communication with the mobile-phone network 50, to detect, for example, an incoming call from the mobile-phone network 50, or at the time of the outgoing call, capture access to a communication line of the mobile-phone network 50.

The storage unit 304 is constituted to include a volatile memory (RAM) and a non-volatile memory (ROM, EPROM, or like). Stored in the storage unit 304 are various programs and various pieces of information relating to a telephone (for example, authentication information or various parameters for performing authentication with the mobile-phone network 50, telephone directory information, call-placing and call-arrival history information, and the like). Furthermore, pieces of program data for various applications, text data, audio data, image data, and the like are stored in the storage unit 304.

The audio input and output control unit 305 operates in accordance with software that is executed in the control unit 306, and plays back audio. The audio input and output control unit 305 acquires digitally signaled audio data from the audio path according to an instruction from the control unit 306, performs analog conversion on the acquired audio data, and outputs a result of the analog conversion to the speaker 313. Furthermore, the audio input and output control unit 305 performs volume output control or audio quality control. Furthermore, according to the instruction from the control unit 306, the audio input and output control unit 305 converts the analog audio that is received from the microphone 312, into digital audio, and performs control that transmits the digital audio to the audio path.

Furthermore, in a case of listening to music and the like that are played back directly in the mobile-phone 30, the audio input and output control unit 305 operates as well. As the audio signal that is output to the speaker 313, in addition to the telephone call audio, for example, there is audio data that is played back by performing a music playback function.

The display/operation unit 303 is constituted to include a liquid crystal display, a touch panel that is arranged on a surface of the liquid crystal display, and drivers for driving these, and functions as a user interface (UI) to which various operations by the user are applied. For example, number keys or icons for the call-arrival and the call-placing, a telephone directory, or the like are displayed on the display/operation unit 303, or information on a communication destination or on a communication source, or operation guide information is displayed on the display/operation unit 303. Furthermore, icons for activating various applications, icons for performing an operation in each of the applications, and an operation menu are displayed. Then, various soft keys are assigned to a touch panel of a liquid crystal display to go along with a liquid crystal display, and all operations on the mobile-phone 30 are performed with the display/operation unit 303.

For example, in the case of activating a music playback function, song titles, or icons and soft keys for various operations are displayed on the display/operation unit 303. Then, keys for operations, for example, keys for various functions, such as a PLAY key, a STOP key, and a PAUSE key, volume adjustment keys for adjusting a volume from the speaker, and the like are displayed on the display/operation unit 303. The display/operation unit 303 acquires these pieces of operational information, and notifies the control unit 306 of the pieces of operational information.

The control unit 306, for example, is constituted to include hardware items, among which a main hardware item is made to be a microcomputer, and executes a program that is embedded in advance, thereby realizing various functions that are retained by the control unit 306. The control unit 306 controls the entire mobile-phone 30.

The call control unit 314 processes an event or various messages that are notified from the display/operation unit 303, the 3G protocol control unit 302, the wireless LAN control unit 307, and the BT control unit 309, and performs state management of a call that takes place in the mobile-phone 30, and a call connection. Furthermore, when an arrival of a mobile-destined call from the mobile-phone network 50 is detected, the call control unit 314 performs control for outputting the call-arrival sound.

In the connection procedure for the audio stream communication, the advanced audio distribution profile (A2DP) may be employed in the case of Bluetooth (a registered trademark), and other stream protocols for the audio streaming, such as the real-time streaming protocol (RTSP), may be employed in a general case.

Moreover, a communication procedure for the remote control of the mobile-phone 30 by the CDL device 1 may be performed by agreeing on a control message independently between devices in mutual communication, but is able to be performed using the audio/video remote control profile (AVRCP) between Bluetooth (a registered trademark)-enabled devices.

In accordance with IEEE 802.11, that is, wireless LAN specifications, the wireless LAN control unit 307 and the wireless LAN communication I/F unit 308 make connections to external wireless LAN devices and perform the data communication.

The BT communication I/F unit 310 is an RF unit that transmits and receives a radio signal in compliance with Bluetooth (a registered trademark) through an antenna, and the BT control unit 309 performs a control instruction to the RF unit, and baseband control, such as communication link control or packet control. For wireless communication between the mobile-phone 30 and the CDL master device 100, the BT communication I/F unit 310 is in the state of the wireless connection using Bluetooth (a registered trademark) that is for a short-distance wireless communication function.

A USB communication I/F unit 311 is a communication interface that connects to various devices (for example, a personal computer or the like) that complies with the USB specifications. The USB communication I/F unit 311, for example, may operate as an electric power supply unit that charges a secondary battery (not illustrated) from the personal computer or the like.

The mobile-phone 30 that includes the constituent units described above may be in the form of a smartphone that has a music player function. Furthermore, the audio data that is played back by the mobile-phone 30, for example, may be stored in the storage unit 304 of the mobile-phone 30, and may be acquired from an external server, using a wireless communication function. Furthermore, the audio data may be acquired from an external storage device (for example, a memory card, a USB memory, or the like).

The storage unit 304 has a function of accumulating pieces of information on music pieces and music files in a prescribed format. For example, the pieces of information on the music pieces, the music files, and the like that are transferred from a download site through the 3G wireless I/F unit 301 or the wireless LAN communication I/F unit 308 are decoded into the prescribed format, and then are accumulated in the storage unit 304.

With a communication function of the BT communication I/F unit 310, a status indicating the state of the mobile-phone 30, or music data is sent from the mobile-phone 30 to the CDL master device 100, the music data is decoded in the CDL master device 100 or the CDL slave device 200, and the decoded music data is played back in the speaker. Furthermore, a command that is input in the operation unit 144, or audio data that is input from the microphone 151 is sent from the CDL slave device 200 to the CDL master device 100 using a signal in compliance with the DECT, is transmitted to the mobile-phone 30 using Bluetooth (a registered trademark), and is received in the BT communication I/F unit 310.

Status information on the mobile-phone 30, for example, information indicating whether or not system control is possible, or information indicating that music playback, stop, or music selection is in progress, is sent to the CDL master device 100 through the BT communication I/F unit 310 in a prescribed format and at a prescribed timing, or, is transferred from the CDL master device 100 to the CDL slave device 200 using the control signal in compliance with the DECT.

A music playback signal from the mobile-phone 30 is in the ADPCM format, and, with a Bluetooth (a registered trademark) signal, is sent to the CDL master device 100. The mobile-phone 30 performs processing (for example, a conversion from MP3 to PCM and a conversion from PCM to ADPCM) and the like, which are steps that are performed before an analog conversion, on the music data that is read from the storage unit 304, and the resulting music data is transferred to the CDL master device 100.

The BT control unit 123 of the CDL master device 100 delivers a playback signal that is compressed in the ADPCM format which is sent from the mobile-phone 30, to the audio input and output control unit 104, analog conversion processing is performed on the delivered playback signal in the audio input and output control unit 104, and a result of the analog conversion processing is released from the two speakers, that is, the speakers 129 and 130. Thus, the user can listen to music playback sound through the CDL master device 100.

Furthermore, the mobile-phone 30 transmits the status information to the CDL master device 100 through the BT communication I/F unit 310, or transmits the status information to the CDL slave device 200 using DECT communication, when necessary.

Furthermore, a signal or information for transferring a call arrival, the pieces of information on the musical pieces that are reproducible, the audio data at the time of the audio telephone call, and the like are transferred from the mobile-phone 30 to the CDL master device 100 (or the CDL slave device 200), using the Bluetooth (a registered trademark) communication (or to the CDL slave device 200 that is a destination thereof, using the DECT communication).

By operating the operation unit 144 of the CDL slave device 200, it is possible to perform switching between pieces of information on playback music pieces, playback ON/Off, or an operation for a response to the call arrival. Furthermore, answering-back to the operational input, or a state indication can also be displayed on the display unit 145 of the CDL slave device 200, and the user can check the answering back or the state indication while taking a look at the display unit 145 of the CDL slave device 200.

The audio telephone call is described.

The CDL master device 100 (or the CDL slave device 200) performs the telephone call with the speaker and the microphone. It is possible for the CDL master device 100 (or the CDL slave device 200) to perform the telephone call through the mobile-phone network 50, as well as the telephone call through a wired telephone network, because the CDL master device 100 and the mobile-phone 30 are connected to each other using the Bluetooth (a registered trademark) for the short-distance wireless communication. Furthermore, starting/ending of the telephone call is possible by operating the operation unit of the CDL master device 100 (or the CDL slave device 200).

Furthermore, in a case where the telephone call is placed using the CDL slave device 200, audio information that is input through a DECT communication function of the CDL slave device 200 is received in the CDL wireless I/F unit 148, the audio information is decoded in the CDL protocol control unit 149, and thus audio data is acquired. Then, the user can listen to the audio data as the audio from the speaker 152, which is converted into an analog signal in the audio input/output control unit 143.

On the other hand, in the reverse manner from what is described above, a user's voice is transmitted to the CDL master device 100 with the CDL wireless I/F unit 148 through the microphone 151. That is, the audio input/output control unit 143 converts an analog audio signal that is input from the microphone 151, into digital data, and performs coding on the digital data. Then, processing for transmission is performed on the resulting digital data in the CDL wireless I/F unit 148, and the call-placing is performed with the antenna.

In this manner, the CDL slave device 200 can use the microphone 151 and the speaker 152 for the audio telephone call, and the speaker 152 of the CDL slave device 200 can be used in order for the user to listen to playback music that is in the mobile-phone 30, as well as to perform the audio telephone call. Additionally, in a case where a vibration generation unit is provided to the CDL slave device 200, for example, if the user does not want the call arrival to prevent the music playback, the call arrival may be set in such a manner that the call arrival is transferred by causing vibration to occur.

Figure 5:
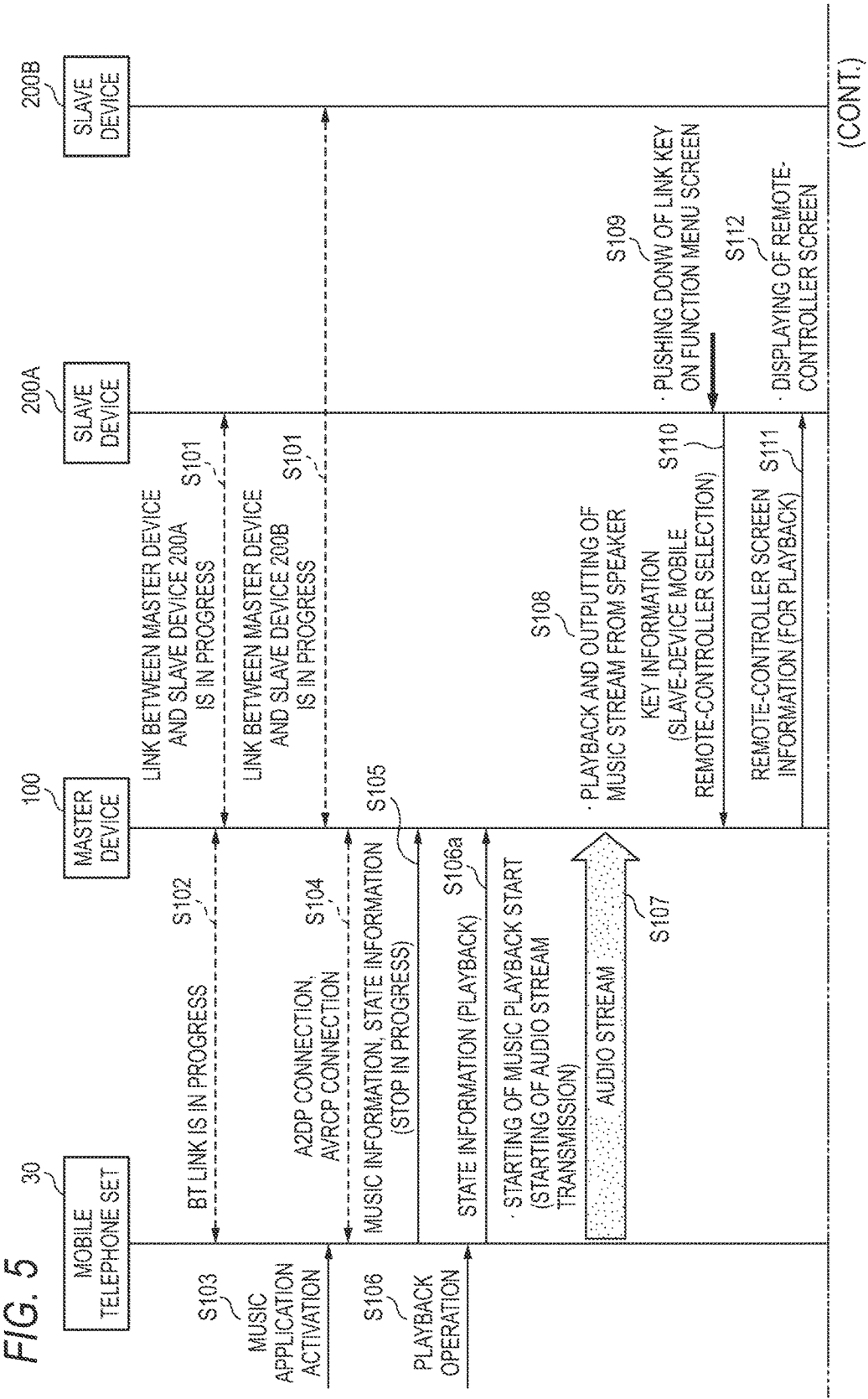
FIG. 5 is a sequence diagram illustrating an operational example in a case where the cordless telephone device and the mobile-phone are linked according to the embodiment of the present invention.

Next, an operational example of the CDL device 1 is described. In the CDL device 1, the CDL device 10 and the mobile-phone 30 are linked. FIG. 5 is a sequence diagram illustrating an operational example in a case where the CDL master device 100, the CDL slave devices 200A and 200B, and the mobile-phone 30 are linked. FIG. 5 assumes that the CDL slave device 200A operates mainly as a remote controller.

First, between the CDL master device 100 and the CDL slave devices 200A and 200B, the CDL protocol control unit 108 of the CDL master device 100 and the CDL protocol control unit 149 of the CDL slave device 200 form a link for wireless communication (for example, DECT), and are in a standby state in which a communication link is established between a cordless telephone master device and the slave device (S101).

Between the CDL master device 100 and the mobile-phone 30, the BT control unit 123 of the CDL master device 100 and the mobile-phone 30 forms a Bluetooth (a registered trademark) link (BT link) (S102). By doing this, both of the CDL master device 100 and the mobile-phone 30 are paired with each other. Between the mobile-phone 30 and the CDL master device 100, for example, A2DP is used to distribute the audio data from the mobile-phone 30 to the CDL master device 100 in a streaming manner, and AVRCP is used to remotely control the mobile-phone 30 from the CDL master device 100.

A2DP is one of the Bluetooth (a registered trademark) protocols which are communication standards which are defined for every Bluetooth (a registered trademark) device, and defines a procedure for distributing the audio data (to play back the audio data while receiving the audio data) in a streaming manner. According to the present embodiment, the mobile-phone 30 is a streaming distribution side (SRC) and the CDL master device 100 is a streaming reception side (SNK).

Furthermore, the AVRCP is employed for the remote controller control such as a wireless earphone that complies with Bluetooth (a registered trademark), and is a Bluetooth (a registered trademark) profile that is used when a main body (for example, a music player) is remotely controlled from the remote controller.

The mobile-phone 30 and the CDL master device 100 operate in accordance with an A2DP procedure, and thus the audio data can be transferred from the mobile-phone 30 to the CDL master device 100. In the CDL master device 100, the audio data can be played back while being received.

Formats of the audio data that is distributed in a streaming manner include for example, a subband codec (SBC) format, a Moving Picture Experts Group (MPEG) Audio Layer-3 (MP3) format, an advanced audio coding (AAC) format, and an adaptive transform acoustic coding (ATRAC) format.

Subsequently, for example, the user operates the mobile-phone 30, and the mobile-phone 30 activates an application for the music playback (S103). When the mobile-phone 30 activates the application for the music playback, the mobile-phone 30 performs wireless connection for the audio streaming distribution and the remote control using A2DP and AVRCP between the mobile-phone 30 itself and the CDL master device 100 and (S104).

Then, when a connection procedure for AVRCP described above is completed, the mobile-phone 30, for example, transmits state information indicating the state of the mobile-phone 30, and the information on the music piece for the audio data that is retained by the mobile-phone 30 or is available for reference is transmitted to the CDL master device 100 (S105). The information on the music piece is information relating to the audio data, and for example, includes an album name, an artist name, a title name, and track numbers. The information on the music piece is transmitted from the mobile-phone 30 to the CDL master device 100 in a timely manner.

Furthermore, when the state (for example, PLAY in progress, STOP in progress, and PAUSE in progress) of the mobile-phone 30 changes with the operation of the mobile-phone 30 by the user or the remote control from the CDL master device 100, the mobile-phone 30 transmits state information indicating a state change to the CDL master device 100.

In the CDL master device 100, through the BT communication I/F unit 124, the music player control unit 113 receives the information on the music piece or the state information from the mobile-phone 30, and retains these pieces of information in the storage unit 103. The information on the music piece and the state information are used when necessary, and for example, are displayed on the display unit 106 or the display unit 145 of the CDL slave device 200 at a prescribed timing.

Starting of the playback of the audio data in the mobile-phone 30, for example, may be directed with the direct operating of the mobile-phone 30 by the user, and may be directed with the operating of the CDL slave device 200 that functions as the remote controller that operates the mobile-phone 30. In FIG. 5, after the application for the music playback is activated, the user operates the operation unit of the mobile-phone 30, and performs an operation of playing back a musical piece of which the selection is in progress (S106).

By doing this, the state of the mobile-phone 30 changes from a stop state to a playback-in-progress state, the state information (playback) indicating that the playback is in progress, from the mobile-phone 30 to the music player control unit 113 of the CDL master device 100, and the music player control unit 113 updates a state of a mobile-type music player to the playback-in-progress state (S106a).

Subsequently, the mobile-phone 30 sequentially transmits pieces of audio data that are retained by the mobile-phone 30 or are available for reference, for example, as pieces of audio streaming data, to the CDL master device 100 (S107).

In the CDL master device 100, the BT control unit 123 receives the audio stream data from the mobile-phone 30, through the BT communication I/F unit 124. The audio stream data is input into the audio input and output control unit 104 through the audio path, is converted into an analog signal, and the resulting analog signal is output, as audio, from the speakers 129 and 130.

Subsequently, in a case where the mobile-phone 30 plays back the audio data, the speakers 129 and 130 of the CDL master device 100 can be used as external speakers of the mobile-phone 30.

In the CDL slave device 200A, the user pushes down a function key (for example, a link key) for performing a link with the mobile-phone 30 while a prescribed function menu screen is being displayed on the display unit 145, and the operation unit 144 detects that the link key is pushed down (S109). When the link key is pushed down, the CDL slave device 200A notifies the CDL master device 100 of a key information message (the link key) indicating a request for starting of a link with the mobile-phone 30 (S110).

Moreover, the operation is described above as the operation of the remote controller of the mobile-phone 30 that starts by pushing down the function key dedicated for the link with the mobile-phone 30. However, a music player link function may be selected from among functions that are displayed on a function menu screen on the CDL slave device 200A, and the operation of the remote controller may start by performing a sequence of key operations that activates a remote controller operation.

In the CDL master device 100, the CDL wireless I/F unit 107 transmits the key information message (the link key) to the call control unit 110 when the key information message (the link key) is received from the CDL slave device 200A, and the call control unit 110 detects that the received key information is the link.

When it is detected that the key information is the link key, the call control unit 110 updates a state of the CDL slave device 200A to a state in which a slave-device remote-controller control is in progress, and notifies the slave-device remote-controller control unit 111 of slave-device remote-controller control activation.

When the slave-device remote-controller activation is notified, the slave-device remote-controller control unit 111 generates the remote-controller screen information, and transmits the remote-controller screen information to the CDL slave device 200A (S111). The remote-controller screen information, for example, includes the information on the musical piece or the state information that is received from the mobile-phone 30. For example, in a case where the CDL slave device 200A operates as the remote controller that operates the mobile-phone 30, the remote-controller screen information may include information indicating a function that is assigned to each key of the CDL slave device 200A, and pieces of information indicating various parameters for and conditions for the CDL slave device 200A operating as the remote controller.

In the CDL slave device 200A, the CDL wireless I/F unit 148 receives the remote-controller screen information in a state where the playback by the music player is in progress, from the CDL master device 100, and the remote-controller screen is displayed on the display unit 145 (S112). With the displaying on the remote-controller screen, the user of the CDL slave device 200A checks contents that are displayed on the remote-controller screen on the CDL slave device 200A, and can perform the operational input for remotely operating the mobile-phone 30. Therefore, at the time when the mobile-phone 30 and the CDL master device 100 are linked, by operating the CDL slave device 200A, the mobile-phone 30 can be remotely operated.

Types of processing that are remote operation targets include PLAY, PAUSE, STOP, FORWARD/NEXT MUSIC-PIECE PLAY, REWIND/PREVIOUS MUSIC-PIECE PLAY, VOLUME UP, AND VOLUME DOWN.

In the CDL slave device 200A, in a case where the operation unit 144 detects a key input operation for VOLUME UP (S113), the CDL wireless I/F unit 148 transmits the key information (VOLUME UP) message to the CDL master device 100 (S114).

In this case, in the CDL master device 100, the CDL wireless I/F unit 107 receives the key information (VOLUME UP) message and transmits the received key information (VOLUME UP) message to the call control unit 110.

When it is checked that the state of the CDL slave device 200A is the state in which the slave-device remote-controller control is in progress, the call control unit 110 notifies the slave-device remote-controller control unit 111 of the key information (VOLUME UP).

The slave-device remote-controller control unit 111 instructs the audio input and output control unit 104 to increase an output volume with the speakers 129 and 130 (S115).

Furthermore, at this time, the slave-device remote-controller control unit 111 may generate the remote-controller screen information for volume adjustment, and may transmit the generated remote-controller screen information to the CDL slave device 200A (S115a).

In the CDL slave device 200A, the CDL wireless I/F unit 148 receives the remote-controller screen information for the volume adjustment from the CDL master device 100, and the remote-controller screen is displayed on the display unit 145 (S115b).

In the CDL slave device 200A, in a case where the operation unit 144 detects an operational input, that is, a pause (S116), the CDL wireless I/F unit 148 transmits the key information (pause) message to the CDL master device 100 (S117).

In this case, in the CDL master device 100, the CDL wireless I/F unit 107 receives the key information (pause) message and transmits the received key information message to the call control unit 110.

When it is checked that the state of the CDL slave device 200A is the state in which the slave-device remote-controller control is in progress, the call control unit 110 notifies the slave-device remote-controller control unit 111 of the key information (pause).

When the key information (pause) message is received, in order to instruct the music player control unit 113 to perform the remote controller operation, that is, the pause, the slave-device remote-controller control unit 111 instructs the music player control unit 113 to perform the pause.

When the instruction for the pause is received from the slave-device remote-controller control unit 111, the music player control unit 113 transmits the remote control information to the mobile-phone 30 in a wireless manner through the BT control unit 123 (S118). The remote control information includes information indicating that the playback by the mobile-phone 30 has to be temporarily stopped.

When the remote control information including pause information is received from the CDL master device 100, the mobile-phone 30 temporarily stops the playback of the audio data that is a playback target and stops transmission of the audio stream data to the CDL master device 100 (S119), and notifies the CDL master device 100 of the state information (pause) indicating a pause state (S120).

In the CDL master device 100, the music player control unit 113 receives the state information indicating the pause, updates the state of the mobile-phone 30 to a pause-in-progress state, and notifies the slave-device remote-controller control unit 111 of the state change. The slave-device remote-controller control unit 111 generates a remote-controller screen for the pause, and transmits the remote-controller screen for the pause to the CDL slave device A that is performing the remote controller control.

In the CDL slave device 200A, the CDL wireless I/F unit 148 receives the remote-controller screen information for the pause from the CDL master device 100, and the monitoring screen is displayed on the display unit 145 (S120b).

In this manner, in a case where the CDL slave device 200 is caused to operate as an external speaker for playing back music that is sent from the mobile-phone 30 through the CDL master device 100, the CDL slave device 200 and the CDL master device 100 are connected to each other using the CDL wireless I/F unit 148, and the CDL master device 100 and the mobile-phone 30 are connected to each other using the Bluetooth (a registered trademark) communication function. Using these communication functions, the remote control information for operating the mobile-phone 30 is sent from the CDL slave device 200, and the music data is sent from the mobile-phone 30 to the CDL slave device 200. The status indicating the state of the mobile-phone 30, the music data, or various pieces of information relating to a music piece, playback of which is in progress, or the like is sent to the CDL slave device 200 using the CDL wireless I/F unit 148.

For example, when the mobile-phone 30 is in a bag or the like, or the CDL slave device 200 is in a user's hand, for music playback, the user operates the CDL slave device 200 and thus performs a playback instruction operation. Thus, a signal for the remote operation is transmitted to the mobile-phone 30. The mobile-phone 30 that receives that signal and receives the playback instruction starts the music playback with a playback function of itself, and a playback signal of the music that is played back is transmitted from the mobile-phone 30 to the CDL slave device 200 using Bluetooth (a registered trademark). The playback signal of the music, which is sent to the CDL slave device 200, is converted in the CDL slave device 200 into an analog signal, and the analog signal is released, as audio, from a speaker of the CDL slave device 200.

For selection of a music piece that is played back, the user displays a list of titles of music pieces on the display unit of the CDL slave device 200, selects a title of a music piece by operating operation means, and can perform a playback instruction to the mobile-phone 30. When it comes to the selection of the title of the music piece that is played back, or the stopping of the playback, the instruction is also provided with the operating of the CDL slave device 200 by the user, is transferred to the mobile-phone 30, and is executed in the mobile-phone 30.

Figure 6:
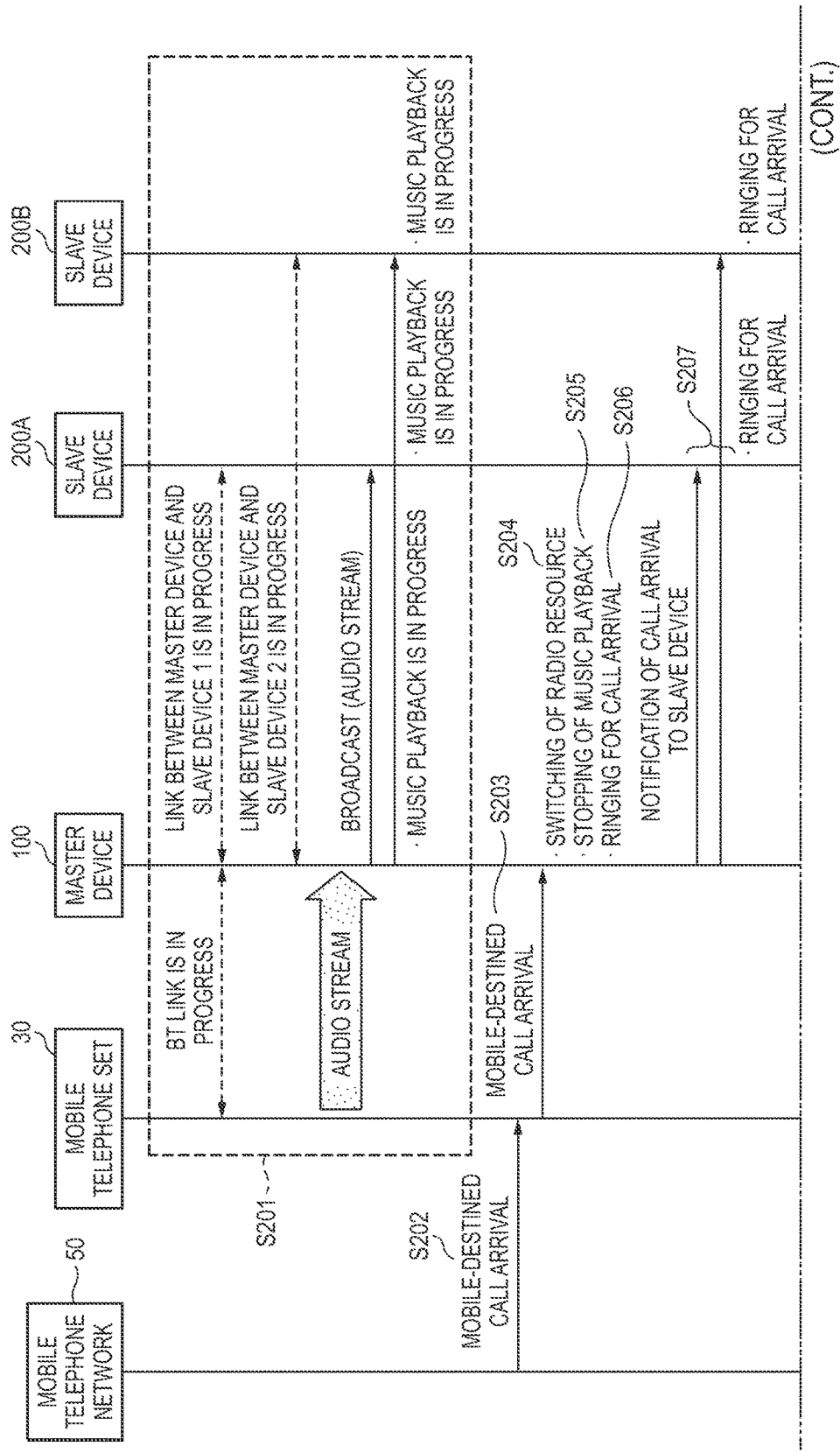
FIG. 6 is a sequence diagram illustrating a link operation in a case where a call arrives at the mobile-phone from a mobile-phone network according to the embodiment of the present invention.

FIG. 6 is a sequence diagram illustrating the cooperative operation in a case where a call arrives at the mobile-phone 30 from the mobile-phone network 50.

In FIG. 6, a step (S201) in which a communication link is established between the CDL master device 100 and the CDL slave device 200 (200A or 200B), a link is formed between the CDL master device 100 and the mobile-phone 30, and the audio stream data from the mobile-phone 30 is played back in the CDL master device 100 or the CDL slave device 200 (200A or 200B) is the same as that described already referring to FIG. 5, and thus a detailed description thereof is omitted. Moreover, in FIG. 5, the CDL slave device 200B is described as being constituted in such a manner that the audio stream data is not played back, but in Step S201, a state is illustrated in which, in the CDL slave device 200B, as is the case in the CDL slave device 200A, the state in which the playback is performed as well is indicated.

When the arrival of the mobile-destined call from the mobile-phone network 50 takes place in the mobile-phone 30 (S202), the mobile-phone 30 notifies the master-device control unit 109 that the call arrives using the Bluetooth (a registered trademark) communication (S203).

The master-device control unit 109 that is notified that the call arrives performs processing in which the user places the telephone call in response to the call arrival, that is, switching between radio resources (S204) and stopping of the music playback (S205). These will be described in detail in the latter part of the specification. Furthermore, with the control by the master-device control unit 109, a ringing sound of the call arrival is input into the audio input and output control unit 104, and the ringing sound of the call arrival is output from the speakers 129 and 130 (S206).

On the other hand, with call-arrival processing by the master-device control unit, the CDL slave device 200 (200A and 200B) is notified that the call arrives, using the DECT communication (S207). The slave-device control unit 147 of the CDL slave device 200 (200A or 200B) that is notified that the call arrives inputs the ringing sound of the call arrival into the audio input and output control unit 104. As a result, the ringing sound of the call arrival is played back from the speaker 152 of the CDL slave device 200 (200A or 200B) (S207).

Moreover, the displaying of the call-arrival in the CDL slave device 200 may be, for example, to display a call-arrival message on the display unit of the CDL slave device 200, or to perform displaying using light, such as simple blinking on the same display unit, as well as to use the ringing sound of the call arrival. Furthermore, the slave-device control unit 147 may control a vibration generation unit (not illustrated), and, when the call arrives during the music playback, the slave-device control unit 147 may generate vibration by operating the vibration generation unit. Furthermore, when it comes to whether or not the vibration generation unit is used, whether the operation of the vibration generation unit is enabled or disabled may be set by a user's setting.

When the user who hears the ringing sound of the call arrival performs a response operation in the CDL master device 100 (S208), the CDL master device 100 transmits a signal that means a response to the call arrival, to the mobile-phone 30, using the Bluetooth (a registered trademark) communication (S209). Then, the mobile-phone 30 notifies the mobile-phone network 50 of the response to the call arrival (S210). Furthermore, when the response operation is performed in the CDL master device 100, the CDL master device 100 forms an audio telephone call path between the CDL master device 100 itself and the mobile-phone 30 using the Bluetooth (a registered trademark) communication (S211).

Furthermore, in a case where the user who hears the ringing sound of the call arrival makes a response in the CDL slave device 200, the response operation is performed in the CDL slave device 200 (S212), and the CDL slave device 200 notifies the CDL master device 100 of the response using the DECT communication (S213). Accordingly, therefore, the CDL master device 100 transmits the signal that means the response to the call arrival, to the mobile-phone 30 using the Bluetooth (a registered trademark) (S14). Then, the mobile-phone 30 notifies the mobile-phone network 50 of the response to the call arrival (S215). Furthermore, the CDL master device 100, as described above, forms the audio telephone call path between the CDL master device 100 itself and the mobile-phone 30 using the Bluetooth (a registered trademark) (S216).

In this manner, a call arrival notification is transferred over an independent path different from that in a music playback system, in the case of the call arrival during the music playback, the arrival of the call at the mobile-phone during the music playback can be transferred directly from the mobile-phone 30 to the CDL master device 100, and the ringing sound can be emitted. Then, with the call arrival notification, the music playback is automatically stopped, and the response to the call arrival is prepared.

Figure 7:
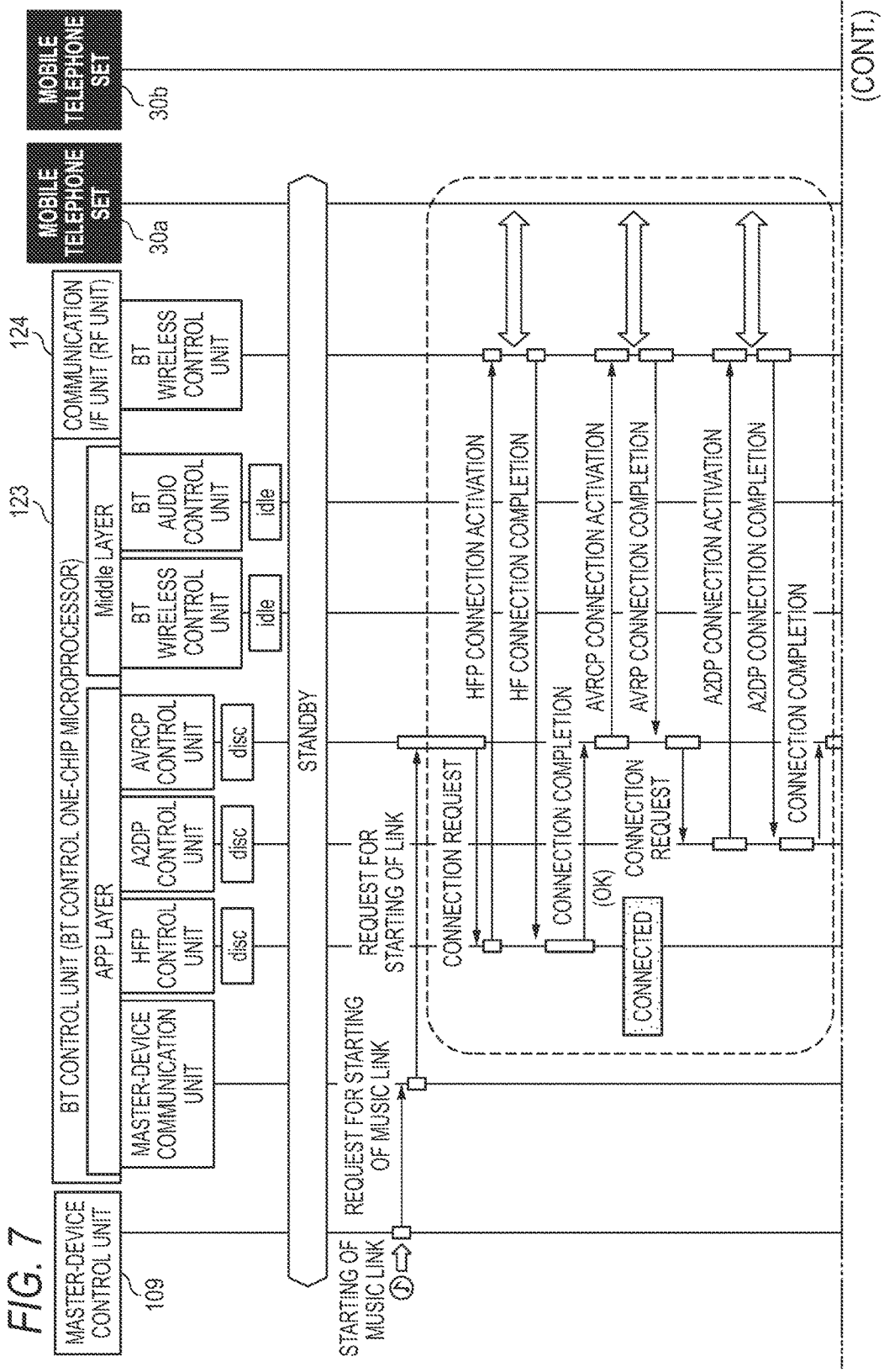
FIG. 7 is a sequence diagram for describing in detail control of a mobile link between a master device of the cordless telephone device and the mobile-phone according to the embodiment of the present invention.

Next, the BT control unit 123 is described in detail referring to FIG. 7. The BT control unit 123 of the CDL master device 100 is configured from an APP layer and a Middle layer, has a function of controlling various functions (profiles) that are stipulated in compliance with Bluetooth (a registered trademark), and is capable of enabling a link with an external terminal (BT terminal) that has the Bluetooth (a registered trademark) communication function. As various functions that are stipulated in compliance with Bluetooth (a registered trademark), for example, there are a hands free profile (HFP) as one for telephone call link control, an advanced audio distribution profile (A2DP) as one for streaming for an AV system, and an audio video remote control profile (AVRCP) as one for an AV system control.

The APP layer of the BT control unit 123 is configured from a master-device communication unit that controls communication with a control unit on the device body side (the master device 100 here), an HFP control unit that performs control relating to activation of a connection between the CDL master device 100 itself and an external BT terminal, an A2DP control unit that controls a connection (connected) to/a disconnection (disc) from an audio streaming path in a broadband, and an AVRCP control unit that generates various controls signals (image quality, playback starting/stopping, audio quality, a volume, and the like) for activating an AV wireless connection or for remotely controlling each operation of the external BT.

Furthermore, the Middle layer of the BT control unit 123 is configured from a BT wireless control unit that performs switching between wireless communication modes (an AV mode and a Talk mode) in compliance with Bluetooth (a registered trademark), and a BT audio control unit that performs switching between quality modes (the AV mode and the Talk mode) in which Bluetooth (a registered trademark) communication is used.

Then, the BT control unit 123 performs signal input and output on the BT communication I/F unit 124 (an RF unit) that is a physical layer, and performs wireless communication between the mobile-phones 30a and 30b (so-called smartphones) using Bluetooth (a registered trademark).

Next, mobile-phone link control is described in detail referring to timing charts in FIGS. 7 to 12.

When a music link operation is performed in the CDL master device 100, a music link starting request is sent from the master-device control unit 109 within the CDL master device 100 to the APP layer of the BT control unit 123 of the master device. In accordance with the music link starting request, within the BT control unit 123, the master-device communication unit sends the link starting request to the AVRCP control unit. Accordingly, the AVRCP control unit makes a connection request to the HFP control unit, and the HFP control unit instructs the BT communication I/F unit 124 to perform HFP connection activation.

In accordance with the HFP connection activation, the BT communication I/F unit 124 (a wireless communication circuit) sends a wireless signal for connection, to a mobile-phone equipped with the function of the music player that is designated in advance, for example, to the mobile-phone 30a, and accordingly performs processing that checks whether or not the wireless connection is possible between the CDL master device 100 and the mobile-phone, depending on whether or not a normal response to the wireless signal is made on the mobile-phone-set side.

In a case where the wireless connection between the BT communication I/F unit 124 itself and the mobile-phone 30a is possible, the BT communication I/F unit 124 secures a minimum channel and slot necessary for the wireless communication, and notifies the HFP control unit of the BT control unit 123 of HFP connection completion which means that the wireless connection is completed. The HFP control unit that receives this notification notifies the AVRCP control unit of the connection completion, and the AVRCP control unit that receives this notification instructs the BT communication I/F unit 124 to perform activation of AV system wireless connection. In accordance with the connection activation, the BT communication I/F unit 124 secures the channel and slot for the wireless communication, on which communication in a broadband between the BT communication I/F unit 124 itself and the mobile-phone 30*a* is possible.

When the radio resource in a radio band that is necessary for music communication between the BT communication I/F unit 124 itself and the mobile-phone 30*a* is secured, the BT communication I/F unit 124 notifies the AVRCP control unit of the BT control unit 123 of AVRCP connection completion, and the AVRCP control unit that receives this notification makes a connection request to the A2DP control unit. Accordingly, the A2DP control unit instructs the BT communication I/F unit 124 to make a connection to the audio streaming path in a band that corresponds to the A2DP. The A2DP control unit that is notified by the BT communication I/F unit 124 that the A2DP connection is completed notifies the AVRCP control unit of the connection completion.

The AVRCP control unit that is notified that the connection is completed makes a resource request to the BT wireless control unit of the Middle layer. The resource request in this case is a request for a communication resource in the AV mode between the BT communication I/F unit 124 itself and the mobile-phone 30*a* (type=mobile-phone 30*a*, and mode=AV).

Furthermore, the BT wireless control unit that receives the request for the resource for the mobile-phone 30*a* described above instructs the BT communication I/F unit 124 to release connections to other BT terminals. In accordance with the instruction, the BT communication I/F unit 124 releases a connection to a BT terminal (for example, the mobile-phone 30*b*) other than the mobile-phone 30*a*. By doing this, a radio resource is secured that has a communication capacity (wireless band • communication quality) at which it is possible for an audio streaming signal to be received in a broadband from the mobile-phone 30*a*.

The BT wireless control unit that is notified by the BT communication I/F unit 124 that the releasing of connections to other BT terminals is completed notifies the AVRCP control unit of a resource response that means the securing of the resource is completed.

The AVRCP control unit that receives the resource response provides an instruction to the BT wireless control unit and sends a link starting response.

In accordance with the link starting response, the master-device communication unit notifies a music link starting response to the master-device control unit 109 within the CDL master device 100, and the master-device control unit 109 displays information indicating that the preparation for a music link is completed, on the display unit 106. With the processing described above, the CDL master device 100 enters a state of waiting for the playback operation, and a guide for the playback operation or the like and a menu for music pieces are displayed on the display unit 106.

Moreover, even in a case where the music link operation is performed in one CDL slave device (for example, the CDL slave device 200A) that is available for connection to the CDL master device 100, with a signal in compliance with the DECT from the CDL slave device 200A, the music link starting request is sent to the CDL master device 100, and within the CDL master device 100, the link starting request is transferred to the BT control unit 123. Furthermore, with the same processing described above, the CDL master device 100 and the CDL slave device 200 enter the state of waiting for the playback operation, and the guide for the playback operation or the like and the menu for music pieces are displayed on the display unit 106.

Figure 8:
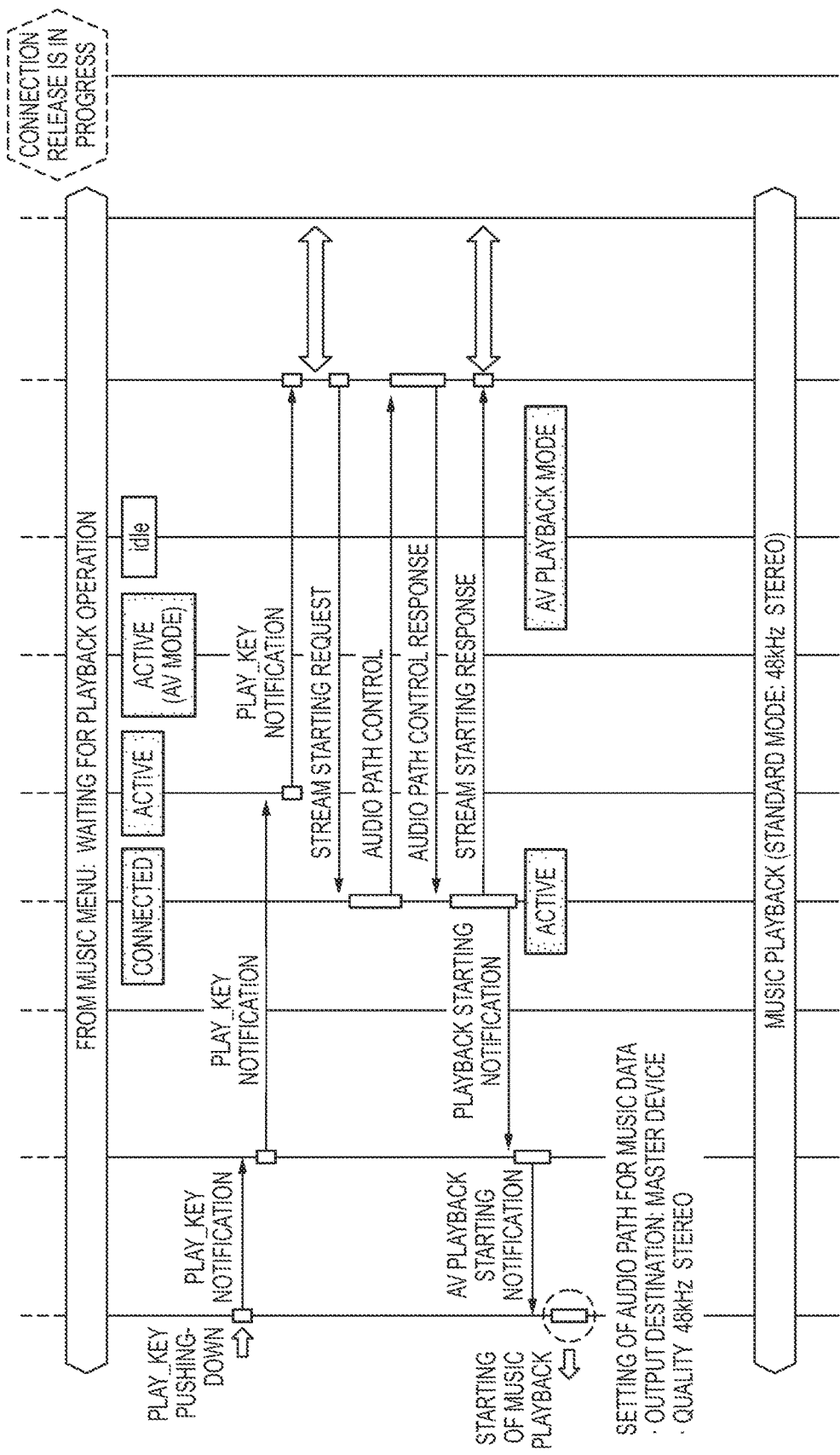
FIG. 8 is a sequence diagram for describing in detail a case where a playback operation is performed in the control of the mobile link between the master device of the cordless telephone device and the mobile-phone according to the embodiment of the present invention.

Thereafter, the user performs an operation of starting the playback. In FIG. 8, when a playback starting operation (pushing down of PLAY_KEY) is performed in the operation unit 105 of the CDL master device 100, operational information on the playback starting operation is sent to the mobile-phone 30, and a playback operation is started in the mobile-phone 30*a*. The audio signal of the music that is sent from the mobile-phone 30*a* and that is played back is transmitted to the CDL master device 100 through the radio resource in a broadband that is already secured by the BT control unit 123, and the playback sound is emitted by the speakers 129 and 130 of the CDL master device 100.

Therefore, the audio that is played back in the mobile-phone can be output using the speakers of the cordless telephone master device. Furthermore, the music playback by the mobile-phone can be remotely controlled using a cordless telephone slave device. Furthermore, because the wireless communication is performed between the mobile-phone having the music playback function and the cordless telephone device, the user does not need to move whenever performing an operation for the music playback.

As described above, when the music link operation is performed in the cordless telephone device, first, the BT control unit 123 checks that the mobile-phone is present within an area in which it is possible for the master device to perform communication, and in addition, starts control that acquires the radio resource necessary for the music link. Thus, the radio resource can be secured at a point in time when the user performs the operation of starting the playback, and in accordance with the operation of starting the playback, the playback sound that is of high sound quality can be immediately emitted. Furthermore, in a case where it cannot be checked that the mobile-phone is present within the area in which it is possible for the master device to perform the communication, an error message "link is not available" is displayed.

Figure 9:
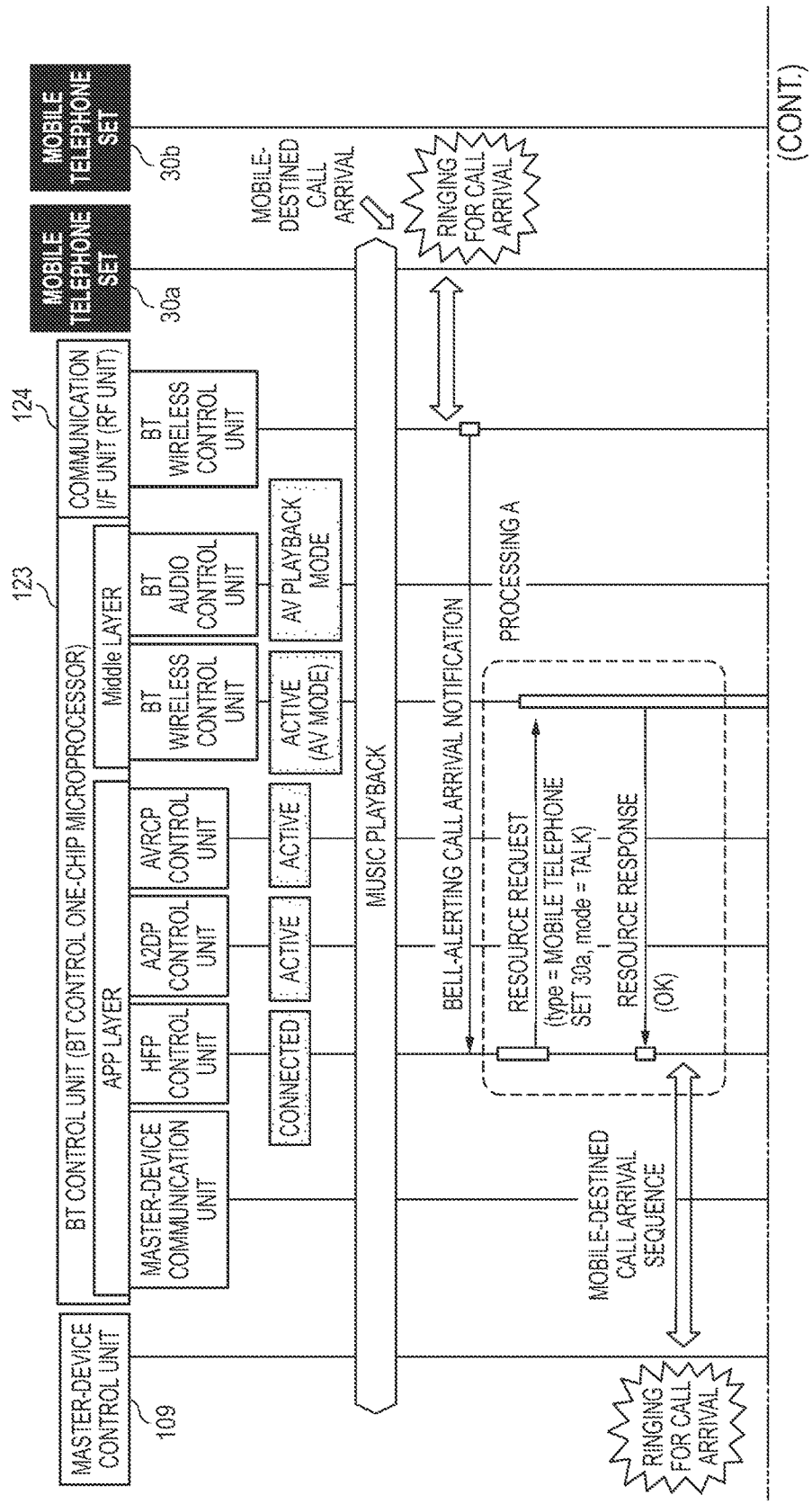
FIG. 9 is a sequence diagram for describing in detail control of the link in a case where a mobile-destined call arrival takes place in the control of the mobile link between the master device of the cordless telephone device and the mobile-phone according to the embodiment of the present invention.

A case where the mobile-destined call arrival takes place in the mobile-phone during a music playback operation will be described below. In FIG. 9, when the mobile-destined call arrival takes place in the mobile-phone during the music playback operation, call arrival information is transmitted from the mobile-phone in which the mobile-destined call arrival takes place, using the Bluetooth (a registered trade mark) communication, and the BT communication I/F unit 124 of the CDL master device 100 notifies the HFP control unit of the BT control unit 123 of the bell-alerting call arrival. For example, in a case where the mobile-destined call arrival takes place in the mobile-phone 30*a* that performs the music playback, in accordance with the call arrival information, the BT control unit 123 starts processing that hands over the radio resource to the telephone call (which has a high priority).

Processing A that is illustrated in FIG. 9 is processing that hands over the radio resource to the telephone call. In processing A, first, in accordance with the bell-alerting call arrival that is sent from the BT communication I/F unit 124, the HFP control unit immediately makes a request to the BT wireless control unit of the Middle layer for the resource for the audio telephone call. The resource request in this case is a request for a communication resource in the Talk mode between the BT communication I/F unit 124 itself and the mobile-phone 30*a* (type=mobile-phone 30*a*, and mode=talk). The BT wireless control unit that receives the resource request starts processing that switches the wireless communication mode in compliance with Bluetooth (a registered trademark) from the AV mode to the Talk mode, and notifies the HFP control of the resource response.

The HFP control unit that is notified of the resource response notifies the master-device control unit 109 of the mobile-destined call arrival by starting a mobile-destined call arrival sequence between the HFP control unit itself and the master-device control unit 109 within the CDL master device 100. Accordingly, the master-device control unit 109 performs control of emission of a call-arrival bell sound, and the call-arrival bell sound starts to be emitted by the speaker of the CDL master device 100.

Processing B in FIG. 9 is processing that causes the AV mode to be switched to the Talk mode and thus stops the music playback. The BT wireless control unit that receives the resource request described above activates processing that switches the wireless communication mode from the AV mode to the Talk mode and thus stops the music playback.

That is, the BT wireless control unit notifies the AVRCP control unit of resource release which means that the resource for the AV mode is released. The AVRCP control unit that is notified of this sends a stream suspending notification that means the suspending of the streaming, to the A2DP control unit. Accordingly, the A2DP control unit notifies the master-device communication unit of the ending of the music playback. Accordingly, the master-device communication unit notifies the master-device control unit 109 of the CDL master device 100 of the ending of AV playback.

Furthermore, the AVRCP control unit receives the resource release described above, and sends a control signal (PAUSE/STOP_KEY notification) for stopping the playback operation by the mobile-phone 30a. The control signal is transmitted to the mobile-phone 30a through the BT communication I/F unit 124, and the playback operation by the mobile-phone 30a is stopped.

According to this, the mobile-phone 30a sends a signal (a stream suspend request) that indicates that the audio streaming has to be suspended, to the CDL master device 100, the signal is sent to the A2DP control unit through the BT communication I/F unit 124, and a signal (a stream suspend response) which means that the signal is received is transmitted from the A2DP control unit to the mobile-phone 30a through the BT communication I/F unit 124.

When the switching between these is completed, the A2DP control unit sends a sound path control signal indicating that the music communication has to be stopped, to the BT wireless control unit of the Middle layer. Accordingly, the BT wireless control unit stops the audio path for the music link that has been performed until that time, and a transition from the AV mode to the Talk mode is completed. By doing this, a music playback sound is stopped in the speakers 129 and 130 of the CDL master device 100.

With the processing described above, the playback of the audio (music) in a broadband is stopped, and the CDL master device 100 and the mobile-phone 30a transits to a mobile-destined incoming call mode.

Moreover, in a case where information relating to a caller is not included in call-arrival notification information that is sent from the mobile-phone 30a, the master-device control unit 109 of the CDL master device 100 displays the information relating to the caller on the display unit 106. Furthermore, in accordance with the information, the master-device control unit 109 searches a telephone directory database that is stored in the storage unit 103, for relevant information, and displays the relevant information that is found as a result of the search, on the display unit 106.

Furthermore, when the mobile-destined call arrival is notified with the mobile-destined call arrival sequence described above, the master-device control unit 109 also notifies the CDL slave device 200 (for example, the CDL slave device 200A) of the mobile-destined call arrival. That is, a signal indicating that the mobile-destined call arrival takes place is transmitted with the signal in compliance with the DECT through the CDL wireless I/F unit 107. Accordingly, in the CDL slave device 200, the slave-device control unit 147 also performs the control of the emission of the call-arrival bell sound, and the call-arrival bell sound starts to be emitted by the speaker 152.

As is described above, when the mobile-destined call arrival sequence is started between the HFP control unit itself and the master-device control unit 109 within the CDL master device 100, the call-arrival bell sound starts to be emitted by the speakers 129 and 130 of the CDL master device 100 during that sequence. With the emission of the call-arrival bell sound described above, the user can know that the mobile-destined call arrival takes place.

As described above, because while the call-arrival bell sound is concurrently emitted, switching processing of the wireless communication mode is automatically performed from before the user performs an operation for a response to the incoming call, the user does not need to perform an operation for the switching of the wireless communication mode.

A case where the user who, during the music playback operation, is alerted by the emission of the call-arrival bell sound to the call arrival, performs an operation in response to the call arrival, will be described below. In FIG. 10, in a case where the user wants to place a call as a response to the call arrival, the user performs an operation for the response to the call arrival in the CDL master device 100 or one CDL slave device 200 that is available for the connection to the CDL master device 100.

In a case where with the operation unit 105 of the CDL master device 100, the operation for the response to the call arrival is performed, an instruction for the response to the incoming call is sent from the master-device control unit 109 to the BT control unit 123. In a case where the operation for the response to the call arrival is performed in a certain CDL slave device 200, with the signal in compliance with the DECT, the instruction for the response to the incoming call is sent from the CDL slave device to the CDL master device 100, and within the CDL master device 100, the instruction for the response to the incoming call is transferred to the BT control unit 123.

The instruction for the response to the incoming call that is sent from the master-device control unit 109 to the BT control unit 123 is received by the master-device communication unit within the BT control unit 123, and the master-device communication unit instructs the HFP control unit to make the response to the incoming call. At this time, as described above, because the BT wireless control unit already switches the wireless communication mode in compliance with Bluetooth (a registered trademark) from the AV mode to the Talk mode, and with the resource response described above, the HFP control unit knows such a state, at this point, the processing B that is illustrated in FIG. 9, that is, the processing that causes the AV mode to be switched to the Talk mode and thus stops the music playback, does not need to be performed.

In accordance with the instruction for the response to the incoming call, the HFP control unit immediately provides an instruction to send a signal (ATA) for the response to the incoming call to the BT communication I/F unit 124, and the signal indicating that the response to the incoming call has to be made is transmitted to the mobile-phone 30a in which the mobile-destined call arrival takes place, through the BT communication I/F unit 124.

In accordance with the signal indicating that the response to the incoming call is made, the mobile-phone 30a performs processing for the response to the incoming call, and sends a state notification (a telephone call in progress) which means that a connection to the other party is performed, and a signal which requests audio link establishment, to the CDL master device 100.

Accordingly, the HFP control unit of the BT control unit 123 of the CDL master device 100 starts control relating to activation of a connection between the CDL master device 100 itself and the mobile-phone 30a, and makes an audio link response to the mobile-phone 30a through the BT communication I/F unit 124.

When the connection between the CDL master device 100 itself and the mobile-phone 30a is completed, the HFP control unit controls the BT wireless control unit in such a manner that the audio path for the telephone call is formed. Accordingly, a bidirectional audio telephone call path is formed between the CDL master device 100 and the mobile-phone 30a, and proceeding to a telephone call mode between the other telephone-call party destination from which the mobile-destined call arrives and the CDL master device 100 takes place (the telephone call in progress).

In a case where the user places a call using the CDL slave device 200, the user's voice is input from the microphone 151, an analog audio signal is converted by the audio input/output control unit 143 into digital data, the digital data is coded, and then, the coded digital data is sent by the CDL wireless I/F unit 148 and the CDL wireless I/F unit 107 to the CDL master device 100. In the CDL master device 100, the coded digital data is sent to the mobile-phone 30a through the BT communication I/F unit 124 over the audio path for the telephone call.

The audio from the mobile-phone 30a is received in the BT communication I/F unit 124 of the master device and goes through the audio path for the telephone call, the received audio is sent to the CDL slave device 200 through the CDL wireless I/F unit 107 and the CDL wireless I/F unit 148, and audio data is acquired by being decoded in the CDL protocol control unit 149. Then, the user can listen to the audio data as the audio from the speaker 152, which is converted into the analog signal in the audio input/output control unit 143.

In a case where the user places a call using the CDL master device 100, the user's voice is input from the microphone 128, an analog audio signal is converted by the audio input and output control unit 104 into digital data, and the resulting digital data is sent to the mobile-phone 30a through the BT communication I/F unit 124 over the audio path for the telephone call. The audio from the mobile-phone 30a is received in the BT communication I/F unit 124 of the master device, goes through the audio path for the telephone call, and is converted into an analog signal in the audio input and output control unit 104. Thus, the user can listen to the resulting analog signal, as audio, from the speaker 130.

As described above in a case where the mobile-destined call arrival takes place during the music playback operation in the CDL master device 100 of the cordless telephone device or the CDL slave device 200, the BT control unit 123 immediately secures the radio resource for the audio telephone call, releases a radio resource that is of high sound quality, and ends the music playback operation in an enforced manner by handing over the radio resource to the telephone call that has a high priority.

Then, when the call-arrival bell sound starts to be emitted by the speaker of the CDL master device 100, processing such as securing of the radio resource for the telephone call or notifying the mobile-phone of the stopping of the playback proceeds concurrently, and when the user performs an operation for the response to the incoming call, completion is almost achieved. Because of this, the CDL master device 100 can immediately control the BT communication I/F unit 124 and thus transmit the response to the incoming call to the mobile-phone 30a, and it is possible to overcome the inconvenience of the operation and to transit to a smooth telephone call state without having to stop the music playback or to perform the operation for securing the radio resource when the user makes the response to the incoming call.

Furthermore, even in a case where the user performs the operation in the CDL slave device 200 in response to the call arrival, with the signal in compliance with the DECT, the signal indicating that the response to the incoming call has to be made is sent from the CDL slave device 200 to the CDL master device 100 through the CDL wireless I/F unit 107. Furthermore, within the CDL master device 100, the signal is transferred to the BT control unit 123 and the response to the incoming call is notified to the mobile-phone.

A case where an operation of placing a call from the CDL master device 100 or the CDL slave device 200 to the mobile-phone network 50 during the music playback operation is performed will be described below.

In FIG. 11, in a case where an operation is performed in which, with the music link, placing of a call from the CDL master device 100 or the CDL slave device 200 that plays back the audio data that is sent from the mobile-phone 30a, to the mobile-phone network 50 is desired, the master-device control unit 109 of the CDL master device 100 notifies the master-device communication unit of the BT control unit 123 of link ending, and accordingly, the master device communication unit notifies the AVRCP control unit of a link ending notification. With the notification, processing that releases the resource for the AV mode is activated.

Processing C that is illustrated in FIG. 11 is processing that releases the resource for the AV mode. In processing C, the AVRCP control unit, which receives the link ending notification, immediately makes a request to the BT wireless control unit of the Middle layer for the resource release for releasing the resource for the AV mode. In accordance with the request, the BT wireless control unit releases the resource for the AV mode.

Furthermore, the AVRCP control unit sends a stream suspending notification that means the suspending of the streaming, to the A2DP control unit. Accordingly, the A2DP control unit notifies the master-device communication unit of the ending of the music playback. Accordingly, the master-device communication unit notifies the master-device control unit 109 of the CDL master device 100 of the ending of AV playback.

Furthermore, the AVRCP control unit receives the link ending notification that is notified from the master-device communication unit and sends the control signal (PAUSE/STOP_KEY notification) for stopping the playback operation by the mobile-phone 30a. The control signal is transmitted to the mobile-phone 30a through the BT communication I/F unit 124, and the playback operation by the mobile-phone 30a is stopped.

According to this, the mobile-phone 30a sends a signal (a stream suspend request) that indicates that the audio streaming has to be suspended, to the CDL master device 100, the signal is then sent to the A2DP control unit through the BT communication I/F unit 124, and a signal (a stream suspend response) which means that the signal is received is transmitted from the A2DP control unit to the mobile-phone 30*a* through the BT communication I/F unit 124.

When the switching between these is completed, the A2DP control unit sends the sound path control signal indicating that the music communication has to be stopped, to the BT wireless control unit of the Middle layer. Accordingly, the BT wireless control unit stops the audio path for the music link that has been performed until that time. By doing this, the music playback sound is stopped in the speakers 129 and 130 of the CDL master device 100.

Processing D that is illustrated in FIG. 11 is processing in a case where a caller's telephone number is input. In processing D, when the user inputs the caller's telephone number (for example, 123-456-7890) for placing a call from the CDL master device 100 or the CDL slave device 200 to the mobile-phone network 50, the master-device control unit 109 of the CDL master device 100 transfers the caller's telephone number to the BT control unit 123, and the HFP control unit of the BT control unit 123 immediately makes a request to the BT wireless control unit of the Middle layer for the resource for the audio telephone call. The resource request in this case is a request for a communication resource in the Talk mode between the CDL master device 100 itself and the mobile-phone 30*a* (type=mobile-phone 30*a*, and mode=talk). The BT wireless control unit that receives the resource request starts processing that switches the wireless communication mode in compliance with Bluetooth (a registered trademark) from the AV mode to the Talk mode, and notifies the HFP control unit of the resource response (ok).

The HFP control unit that is notified of the resource response starts a sequence for outgoing call activation between the HFP control unit and the master-device control unit 109 within the CDL master device 100. That is, the caller's telephone number (for example, 123-456-7890) is transmitted to the mobile-phone 30*a* through the BT communication I/F unit 124. In accordance with the transmission of the caller's telephone number, the mobile-phone 30*a* starts processing for placing the call to the mobile-phone network 50 and transmits the caller's telephone number to the mobile-phone network 50. Then, the mobile-phone 30*a* sends a state notification which means that calling is in progress, to the CDL master device 100.

Then, the mobile-phone 30*a* transmits the caller's telephone number to the mobile-phone network 50, and, in a case where a state of calling to the other party destination is attained, sends a signal for requesting the audio link establishment, to the CDL master device 100. Accordingly, the HFP control unit of the CDL master device 100 starts the control relating to the activation of the connection between the CDL master device 100 itself and the mobile-phone 30*a*, and makes the audio link response to the mobile-phone 30*a* through the BT communication I/F unit 124.

Then, the HFP control unit controls the BT wireless control unit in such a manner that the audio path for the telephone call is formed. Accordingly, the bidirectional audio telephone call path is formed between the CDL master device 100 and the mobile-phone 30*a*. However, this is still in a state in which the mobile-phone 30*a* transmits the caller's telephone number to the mobile-phone network 50 and the calling to the other party destination is performed (the calling in progress).

Figure 12:
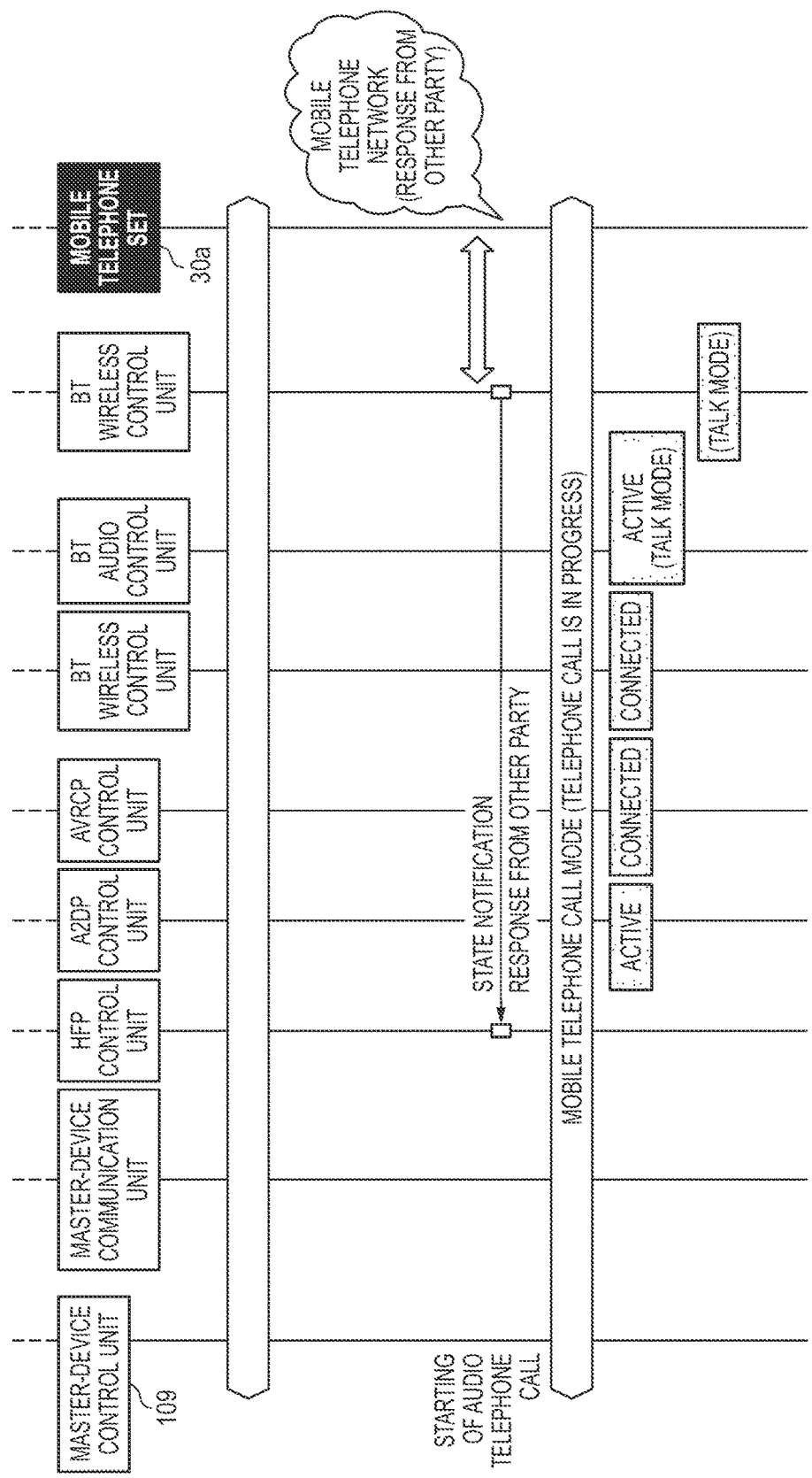
FIG. 12 is a sequence diagram for describing in detail the control of the link in a case where a mobile-originated call is placed in the control of the mobile link between the master device of the cordless telephone device and the mobile-phone according to the embodiment of the present invention.

In FIG. 12, when the other party that is called makes a response, and a telephone call path connection between the mobile-phone 30*a* and the other telephone-call party is completed, a state notification indicating the other party's response is sent from the mobile-phone 30*a* to the HFP control unit through the BT communication I/F unit 124. Accordingly, proceeding to a mobile-phone call mode between the other telephone-call party destination and the CDL master device 100 takes place (the calling in progress).

Even in this case, in a case where the user places a call using the CDL slave device 200, the user's voice is sent to the CDL master device 100, and with the audio path for the telephone call, the user's voice is sent from the CDL master device 100 to the mobile-phone 30*a* through the BT communication I/F unit 124. Furthermore, the audio from the mobile-phone 30*a* is received in the BT communication I/F unit 124 of the master device, and is sent from the CDL master device 100 to the CDL slave device 200 over the audio path for the telephone call. Thus, the user can listen to the resulting audio from the speaker 152.

With the processing described above, during the music playback operation in the CDL master device 100 or the CDL slave device 200 of the cordless telephone device, even in a case where an operation is performed to place a call to the mobile-phone network 50 in the CDL master device 100 or the CDL slave device 200, in conjunction with an operation of placing a call, the BT control unit 123 of the CDL master device 100 immediately releases the radio resource that is of high sound quality, and suspends the audio streaming. Because of this, even in this case, the music playback operation is ended in an enforced manner. Then, because the radio resource for the telephone call is re-secured, the BT control unit 123 can perform the activation of the outgoing call to the mobile-phone 30 through the BT communication I/F unit 124.

Moreover, the present application is a continuation-in-part of international patent application No. PCT/JP2014/006166 filed on Dec. 10, 2014 claiming the priority of Japanese Application No. 2013-254611 filed on Dec. 10, 2013, the contents of which are incorporated by reference herein in its entirety.

The present invention is useful for a telephone device that can strengthen a link with a mobile-phone in a case where audio data is played back by the mobile-phone.

What is claimed is:

1. A telephone device, comprising:
   a landline telephone line interface unit;
   a master-device control unit that controls the telephone device;
   a short-distance wireless communication control unit that controls short-distance wireless communication of data with a mobile-phone;
   an audio speaker; and
   an audio processing unit, which, in operation, receives audio data from the mobile-phone using the short-distance wireless communication and causes the audio speaker to perform music playback by outputting the audio data from the mobile phone,
   wherein, when the master-device control unit detects a caller operation of placing a call to a mobile-phone network by the telephone device during output of the audio data from the audio speaker, the master-device control unit notifies the short-distance wireless communication control unit of information on the caller operation of placing the call to the mobile phone network, and in response to the short-distance wireless communication control unit receiving the notification on the caller operation of placing the call to the mobile phone network, the short-distance wireless communication control unit starts processing that releases a radio resource for communicating the audio data, used for the music playback, from the mobile phone to the telephone device and sets, for the call, a radio resource for an audio path between the mobile phone and the telephone device.

2. The telephone device according to claim 1,
wherein the telephone device is a cordless telephone device that includes a cordless telephone master device which is connected to the landline telephone network and a cordless telephone slave device,
wherein the audio data used for the music playback that is received from the mobile-phone using the short-distance wireless communication, is transferred to the cordless telephone slave device.

3. The telephone device according to claim 2,
wherein transferring of the audio data sent from the mobile-phone to the cordless telephone slave device can be remotely performed with an operation in which an operation unit of the cordless telephone slave device is used.

4. The telephone device according to claim 2,
wherein the cordless telephone slave device includes a display unit,
wherein the cordless telephone master device transfers information, on a music piece that is received from the mobile-phone using the short-distance wireless communication, to the cordless telephone slave device, and
wherein the cordless telephone slave device displays the information on the music piece on the display unit.

5. The telephone device according to claim 2,
wherein, when a signal indicating that a caller operation of placing a mobile-originated call is performed by operating the cordless telephone slave device is received by the master-device control unit during output of the audio data from the speakers, the master-device control unit of the cordless telephone master device controls the short-distance wireless communication unit to release the radio resource for the music playback and set the radio resource for the call.

6. The telephone device according to claim 1,
wherein communication schemes for the short-distance wireless communication include a communication scheme that complies with IEEE 802.15.1 specifications.

7. A mobile-phone linking method for forming a communication link between a telephone device including a landline telephone line interface unit and a mobile-phone using a short-distance wireless communication, the mobile-phone linking method comprising:

forming a connection for short-distance wireless communication between the telephone device and the mobile-phone;
performing music playback from a speaker of the telephone device by outputting audio data received from the mobile-phone using the short-distance wireless communication;
notifying a control unit within the telephone device of a caller operation of placing a call to mobile phone network via the telephone device;
releasing a radio resource for communicating the audio data, used for the music playback, in the short-distance wireless communication when the control unit within the telephone device detects the caller operation of placing a call to a mobile phone network via the telephone device during output by the telephone device of the audio data received from the mobile phone; and
setting, for the call, a radio resource in the short-distance wireless communication for an audio path between the mobile phone and the telephone device after the radio resource for communicating the audio data used for the music playback is released.

8. The telephone device of claim 1, wherein the released radio resource is a broadband radio resource.

9. The telephone device of claim 1, wherein the released radio resource is of a high sound quality relative to the radio resource set for the audio path of the call.

10. The telephone device of claim 8, wherein the radio resource set for the audio path of the call is a narrower band radio resource audio source relative to the broadband radio resource.

11. The mobile-phone linking method of claim 7, wherein the releasing a radio resource for communicating audio data used for music playback includes releasing a broadband radio resource.

12. The mobile-phone linking method of claim 7, wherein the releasing a radio resource for communicating audio data used for music playback includes releasing a radio resource that is of a high sound quality relative to the radio resource set for the audio path of the call.

13. The mobile-phone linking method of claim 11, wherein setting, for the call, a radio resource in the short-distance communication includes setting for the audio path of the call a radio resource that has a narrower band relative to the broadband radio resource.

* * * * *